United States Patent
Morris

(10) Patent No.: US 10,375,215 B1
(45) Date of Patent: *Aug. 6, 2019

(54) METHODS, SYSTEMS, AND COMPUTER PROGRAM PRODUCTS FOR SHARING INFORMATION FOR DETECTING AN IDLE TCP CONNECTION

(71) Applicant: SITTING MAN, LLC, Raleigh, NC (US)

(72) Inventor: Robert Paul Morris, Raleigh, NC (US)

(73) Assignee: Jenam Tech, LLC, Longview, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/040,522

(22) Filed: Jul. 19, 2018

Related U.S. Application Data

(63) Continuation of application No. 15/915,047, filed on Mar. 7, 2018, now Pat. No. 10,075,564, which is a continuation of application No. 15/694,802, filed on Sep. 3, 2017, now Pat. No. 9,923,995, which is a continuation-in-part of application No. 14/667,642, filed on Mar. 24, 2015, now abandoned, which is a continuation-in-part of application No. 13/477,402, filed on May 22, 2012, now abandoned, which is a continuation of application No. 12/714,454, filed on Feb. 27, 2010, now Pat. No. 8,219,606.

(51) Int. Cl.
*G06F 15/16* (2006.01)
*H04L 29/06* (2006.01)

(52) U.S. Cl.
CPC ............................. *H04L 69/16* (2013.01)

(58) Field of Classification Search
CPC ...................................................... H04L 69/16
See application file for complete search history.

(56) References Cited

U.S. PATENT DOCUMENTS

| | | |
|---|---|---|
| 6,412,006 B2 | 6/2002 | Naudus |
| 7,404,210 B2 | 7/2008 | Lin |
| 7,426,569 B2 | 9/2008 | Dunk |
| 7,684,346 B2 | 3/2010 | Valli |
| 7,720,989 B2 | 5/2010 | Dunk |

(Continued)

OTHER PUBLICATIONS

Allman, M., Paxson, V., Stevens, W., "TCP Congestion Control", RFC 2581, Internet Engineering Task Force, http://tools.ietf.org/rfc/rfc2581.txt,-Apr. 1999.

(Continued)

*Primary Examiner* — Moustafa M Meky
(74) *Attorney, Agent, or Firm* — Patrick E. Caldwell, Esq.; The Caldwell Firm, LLC

(57) ABSTRACT

A computer-implemented method is provided, comprising causing access to be provided, to a client computer, to code that causes the client computer to operate in accordance with a protocol that is separate from TCP, in order to establish a protocol connection with another server computer, by: receiving a packet, detecting an idle time period parameter field in the packet, identifying metadata in the idle time period parameter field for an idle time period, where, after the idle time period is detected, the second protocol connection is deemed inactive, and creating or modifying, by the client computer and based on the metadata, a timeout attribute associated with the second protocol connection.

39 Claims, 8 Drawing Sheets

(56) References Cited

U.S. PATENT DOCUMENTS

| | | | |
|---|---|---|---|
| 7,729,271 | B2 | 6/2010 | Tsuchiya et al. |
| 8,073,964 | B2 | 12/2011 | Dunk |
| 8,219,606 | B2 | 7/2012 | Morris |
| 9,923,995 | B1* | 3/2018 | Morris .................. G06F 9/50 |
| 2005/0054347 | A1 | 3/2005 | Kakani |
| 2005/0063304 | A1 | 3/2005 | Sillasto et al. |
| 2005/0135248 | A1* | 6/2005 | Ahuja .................. H04L 47/10 370/235 |
| 2006/0034179 | A1 | 2/2006 | Carter et al. |
| 2007/0008884 | A1* | 1/2007 | Tang .................. H04L 29/06 370/230 |
| 2009/0252072 | A1 | 10/2009 | Lind et al. |
| 2010/0057844 | A1 | 3/2010 | Johnson |
| 2011/0213820 | A1 | 9/2011 | Morris |

OTHER PUBLICATIONS

Busatto, Fabio, "TCP Keepalive Overview", TCP Keepalive HOWTO, Section 2, http://tldp.org/HOWTO/html_single/TCP-Keepalive-HOWTO/#overview, accessed Jan. 2010, May 2007.

Eggert, L., Gont, F., "TCP User Timeout Option", RFC 5482, Internet Engineering Task Force (IEFT), http://tools.ietf.org/html/rfc5482.txt, Mar. 2009.

Koziero, Charles M., TCP Connection Management and Problem Handling, the Connection Reset Function, and TCP "Keepalives", The TCP/IP Guide, p. 3, http://www.tcpipguide.com/free/t_TCPConnectionManagementandProblemHandlingtheConnec-3.htm, accessed Feb. 2010, (c) 2003-2010.

Mathis, M., Mandave, J., Floyd, S., Romanow, A., "TCP Selective Acknowledgement Options", RFC 2018, Internet Engineering Task Force, http://tools.ietf.org/rfc/rfc2018.txt, Oct. 1996.

Nagle, John, "Congestion Control in IP/TCP Internetworks", RFC 896, Ford Aerospace and Communications Corporation, http://tools.ietf.org/rfc/rfc896.txt, Jan. 1984.

Postel, John(ed.), Editor; "Transmission Control Protocol—DARPA Internet Protocol Specification", RFC 793, USC/Information Sciences Institute, http://tools.ietf.org/rfc/rfc793.txt, Sep. 1981.

Office Action Summary in U.S. Appl. No. 12/714,063 dated Jun. 21, 2012.

Office Action Summary in U.S. Appl. No. 12/714,063 dated Mar. 4, 2013.

Office Action Summary in U.S. Appl. No. 12/714,063 dated Sep. 27, 2013.

Office Action Summary in U.S. Appl. No. 12/714,454 dated Feb. 23, 2012.

Office Action Summary in U.S. Appl. No. 13/477,402 dated Sep. 24, 2014.

Office Action Summary in U.S. Appl. No. 15/694,802 dated Nov. 29, 2017.

Notice of Allowance for U.S. Appl. No. 16/040,517 dated Mar. 26, 2019.

* cited by examiner

METHODS, SYSTEMS, AND COMPUTER PROGRAM PRODUCTS FOR SHARING INFORMATION FOR DETECTING AN IDLE TCP CONNECTION

RELATED APPLICATIONS

This application is a continuation of, and claims priority to U.S. patent application Ser. No. 15/915,047 entitled "METHODS, SYSTEMS, AND COMPUTER PROGRAM PRODUCTS FOR SHARING INFORMATION FOR DETECTING AN IDLE TCP CONNECTION," filed on Mar. 7, 2018 which, in turn, is a continuation of, and claims priority to U.S. patent application Ser. No. 15/694,802, now U.S. Pat. No. 9,923,995, entitled "METHODS, SYSTEMS, AND COMPUTER PROGRAM PRODUCTS FOR SHARING INFORMATION FOR DETECTING AN IDLE TCP CONNECTION," filed on Sep. 3, 2017 which, in turn, is a continuation-in-part of, and claims priority to U.S. patent application Ser. No. 14/667,642, entitled "METHODS, SYSTEMS, AND COMPUTER PROGRAM PRODUCTS FOR SELECTING A RESOURCE BASED ON A MEASURE OF A PROCESSING COST," filed on Mar. 24, 2015 which, in turn, is a continuation-in-part of and claims priority to U.S. patent application Ser. No. 13/477,402, entitled "METHODS, SYSTEMS, AND COMPUTER PROGRAM PRODUCTS FOR SHARING INFORMATION FOR DETECTING AN IDLE TCP CONNECTION," filed May 22, 2012 which is a continuation of and claims priority to U.S. patent application Ser. No. 12/714,454, now U.S. Pat. No. 8,219,606, entitled "METHODS, SYSTEMS, AND COMPUTER PROGRAM PRODUCTS FOR SHARING INFORMATION FOR DETECTING AN IDLE TCP CONNECTION," filed Feb. 27, 2010.

U.S. patent application Ser. No. 12/714,454, entitled "METHODS, SYSTEMS, AND COMPUTER PROGRAM PRODUCTS FOR SHARING INFORMATION FOR DETECTING AN IDLE TCP CONNECTION," filed Feb. 27, 2010 is incorporated herein by reference in its entirety for all purposes.

This application is related to the following commonly owned U.S. Patent Applications, the entire disclosure of which is incorporated by reference herein in its entirety for all purposes: application Ser. No. 12/714,063 filed on 2010 Feb. 26, entitled "Methods, Systems, and Program Products for Detecting an Idle TCP Connection".

BACKGROUND

Various implementations of the transmission control protocol (TCP) in network nodes support a number of options that are not negotiated or even communicated between or among any of the nodes. Some of these options are included in the specification of the TCP while others are not. For example, the TCP keep-alive option is supported by a number of implementations of the TCP. It is not, however, part of the TCP specification as described in "Request for Comments" (RFC) document RFC 793 edited by John Postel, titled "Transmission Control Protocol, DARPA Internet Program Internet Protocol Specification" (September 1981), which is incorporated here in its entirety by reference. One, both, or neither node including an endpoint in a TCP connection may support a keep-alive option for the connection. Each node supports or does not support keep-alive for a TCP connection based on each node's requirements without consideration for the other node in the TCP connection.

With respect to the keep-alive option, some argue that it is unnecessary and that it can waste network bandwidth. Some of these critics point out that a keep-alive packet can bring down a TCP connection. Further, since nodes including endpoints in a TCP connection do not cooperate in supporting the keep-alive option, the nodes may operate in opposition to one another and/or may waste resources by duplicating function, according to critics of the keep-alive option.

Proponents of the keep-alive option claim there is a benefit to detecting a dead peer/partner endpoint sooner. A node providing TCP keep-alive can also indirectly detect when a network is so congested that two nodes with endpoints in a TCP connection are effectively disconnected. Proponents argue that keep-alive can keep an inactive TCP connection open. For example, some network nodes such as firewalls are configured to close TCP connections determined to be idle or inactive in order to recover resources. Keep-alive can prevent this. This is good from the perspective of the node sending keep-alive packets, but the keep-alive packets might cause the firewall to waste resources and possibly block or terminate TCP connections with other nodes.

TCP keep-alive and the debate of its benefits and faults have been around for decades. To date no mechanism to allow two TCP connection endpoints to cooperate in supporting the keep-alive option has been proposed or implemented. The broader issue of enabling cooperation and negotiation between nodes in a TCP connection in detecting and managing idle, underactive, and/or dead TCP connections remains unaddressed.

Accordingly, there exists a need for methods, systems, and computer program products for sharing information for detecting an idle TCP connection.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

A computer-implemented method is provided, comprising: causing access to be provided to a server computer including: a non-transitory memory storing a network application, and one or more processors in communication with the non-transitory memory, wherein the one or more processors execute the network application to operate in accordance with a first protocol including a transmission control protocol (TCP); causing a TCP connection to be established with a client computer, by: communicating a segment including at least one first synchronize bit, communicating a first acknowledgement of the segment, and at least one second synchronize bit, and communicating a second acknowledgement; causing first data to be communicated from the server computer to the client computer utilizing the TCP connection in accordance with the TCP protocol and a hypertext transfer protocol (HTTP), for being presented to a user of the client computer; causing the server computer to permit second data, from the user of the client computer, to be received at the server computer from the client computer utilizing the TCP connection in accordance with the TCP protocol and the hypertext transfer protocol (HTTP); and causing access to be provided, to the client computer, to code that causes the client computer to operate in accordance with a second protocol that is separate from the TCP, in order to establish a second protocol connection with another server computer, by: receiving a packet, detecting an idle time period parameter field in the packet, identifying metadata in the idle time period parameter field for an idle time period, where, after the idle time period is detected, the second protocol connection is deemed inactive, and creating or modifying, by the client computer and based on the metadata, a timeout attribute associated with the second protocol connection.

Another computer-implemented method is provided comprising: providing access to a server computer including: a non-transitory memory storing a network application, and one or more processors in communication with the non-transitory memory, wherein the one or more processors execute the network application to operate in accordance with a first protocol including a transmission control protocol (TCP); causing a TCP connection to be established with a client computer, by communicating a segment including at least one first synchronize bit; communicating a first acknowledgement of the segment, and at least one second synchronize bit; and communicating a second acknowledgement; causing first data to be communicated from the server computer to the client computer utilizing the TCP connection in accordance with the TCP protocol and a hypertext transfer protocol (HTTP), for being presented to a user of the client computer; causing the server computer to permit second data, from the user of the client computer, to be received at the server computer from the client computer utilizing the TCP connection in accordance with the TCP protocol and the hypertext transfer protocol (HTTP); and providing access to code that results in the client computer operating in accordance with a second protocol that is separate from the TCP, in order to establish a second protocol connection with another server computer, by: identifying idle information for detecting an idle time period, after which, the second protocol connection is subject to deactivation, generating a second protocol packet including an idle time period parameter field identifying metadata for the idle time period based on the idle information, and sending, from the client computer to the another server computer, the second protocol packet to provide the metadata for the idle time period to the another server computer, for use by the another server computer in creating or modifying, based on the metadata, a timeout attribute associated with the second protocol connection.

Yet another computer-implemented method is provided comprising: providing access to a server computer including: a non-transitory memory storing instructions, and one or more processors in communication with the non-transitory memory, wherein the one or more processors execute the instructions such that a network application operates in accordance with a first protocol including a transmission control protocol (TCP), the server computer, when operating in accordance with the first protocol to set up a TCP connection with a client computer, configured to: communicate a segment including at least one first synchronize bit, communicate a first acknowledgement of the segment, and at least one second synchronize bit, and communicate a second acknowledgement; causing first data to be communicated from the server computer to the client computer utilizing the TCP connection in accordance with the TCP protocol and a hypertext transfer protocol (HTTP), for being presented to a user of the client computer; causing the server computer to permit second data, of the user of the client computer, to be received at the server computer from the client computer utilizing the TCP connection in accordance with the TCP protocol and the hypertext transfer protocol (HTTP); and providing access to code that causes the client computer to operate in accordance with a second protocol that is different from the TCP and that operates above an Internet Protocol (IP) layer and below a hypertext transfer protocol (HTTP) application layer, in order to setup a second protocol connection with another server computer, by: receiving, by the client computer from the another server computer, a packet, identifying metadata, that specifies a number of seconds or minutes, in an idle time period parameter field in the packet for an idle time period during which, no packet is communicated that meets each of the following criteria: a) communicated via the second protocol connection, and b) causes the second protocol connection to be kept at least partially alive, and determining, by the client computer and based on the metadata, a timeout attribute associated with the second protocol connection.

Still yet another computer-implemented method is provided comprising: providing access to a server computer including: a non-transitory memory storing instructions, and one or more processors in communication with the non-transitory memory, wherein the one or more processors execute the instructions such that a network application operates in accordance with a first protocol including a transmission control protocol (TCP) that operates above an Internet Protocol (IP) layer and below a hypertext transfer protocol (HTTP) application layer, the server computer, when operating in accordance with the first protocol to set up a TCP connection with a client computer, configured to: communicate a segment including at least one first synchronize bit, communicate a first acknowledgement of the segment, and at least one second synchronize bit, and communicate a second acknowledgement; causing first data to be communicated from the server computer to the client computer utilizing the TCP connection in accordance with the TCP protocol and a hypertext transfer protocol (HTTP), for being presented to a user of the client computer; causing the server computer to permit second data, of the user of the client computer, to be received at the server computer from the client computer utilizing the TCP connection in accordance with the TCP protocol and the hypertext transfer protocol (HTTP); and providing access to code that results in the client computer operating in accordance with a second protocol, that is different from the TCP and operates above the IP layer and below the HTTP application layer, in order to setup a second protocol connection with another server computer, and to: receive idle information for use in detecting an idle time period during which no signal is communicated that meets each of the following criteria: a) communicated in the second protocol connection, and b) results in the second protocol connection being at least partially kept alive, generate, based on the idle information, a second protocol packet including an idle time period parameter field identifying metadata that is specified in a number of seconds or minutes, and send, from the client computer to another server computer and during the set up of the second protocol connection, the second protocol packet to provide the metadata to the another server computer, for use by the another server computer in determining a timeout attribute associated with the second protocol connection.

Other methods and systems are also described for sharing information for detecting an idle TCP connection. In one aspect, a method includes receiving, by a second node from a first node, a first transmission control protocol (TCP) packet in a TCP connection. The method further includes detecting a first idle time period header, in the first packet, identifying metadata for a first idle time period, detectable by the first node, during which no TCP packet including data in a first TCP data stream sent in the TCP connection by the second node is received by the first node. The method still further includes modifying, based on the metadata, by the second node a timeout attribute associated with the TCP connection.

Further, a system for sharing information for detecting an idle TCP connection is described. The system includes an execution environment including an instruction processing unit configured to process an instruction included in at least one of a net in-port component, an idle time period option handler component, and an option attribute handler component. The system includes the net in-port component configured for receiving, by a second node from a first node, a first transmission control protocol (TCP) packet in a TCP connection. The system further includes the idle time period option handler component configured for detecting a first idle time period header, in the first packet, identifying metadata for a first idle time period, detectable by the first node, during which no TCP packet including data in a first TCP data stream sent in the TCP connection by the second node is received by the first node. The system still further includes the option attribute handler component configured for modifying, based on the metadata, by the second node a timeout attribute associated with the TCP connection In another aspect, a method for sharing information for detecting an idle TCP connection is described that includes receiving, by a first node, first idle information for detecting a first idle time period during which no TCP packet including data in a first data stream sent in the TCP connection by a second node is received by the first node. The method further includes generating a TCP packet including a first idle time period header identifying metadata for the first idle time period based on the first idle information. The method still further includes sending the TCP packet in the TCP connection to the second node to provide the metadata for the first idle time period to the second node. The method also includes detecting the first idle time period based on the first idle information. The method additionally includes deactivating the TCP connection in response to detecting the first idle time period.

Still further, a system for sharing information for detecting an idle TCP connection is described. The system includes an execution environment including an instruction processing unit configured to process an instruction included in at least one of an idle time period policy component, a packet generator component, a net out-port component, an idle time period monitor component, and a connection state component. The system includes the idle time period policy component configured for receiving, by a first node, first idle information for detecting a first idle time period during which no TCP packet including data in a first data stream sent in the TCP connection by a second node is received by the first node. The system includes the packet generator component configured for generating a TCP packet including a first idle time period header identifying metadata for the first idle time period based on the first idle information. The system still further includes the net out-port component configured for sending the TCP packet in the TCP connection to the second node to provide the metadata for the first idle time period to the second node. The system includes the idle time period monitor component configured for detecting the first idle time period based on the first idle information. The system includes the connection state component configured for deactivating the TCP connection in response to detecting the first idle time period.

BRIEF DESCRIPTION OF THE DRAWINGS

Objects and advantages of the present invention will become apparent to those skilled in the art upon reading this description in conjunction with the accompanying drawings, in which like reference numerals have been used to designate like or analogous elements, and in which.

DETAILED DESCRIPTION

Figure 1:
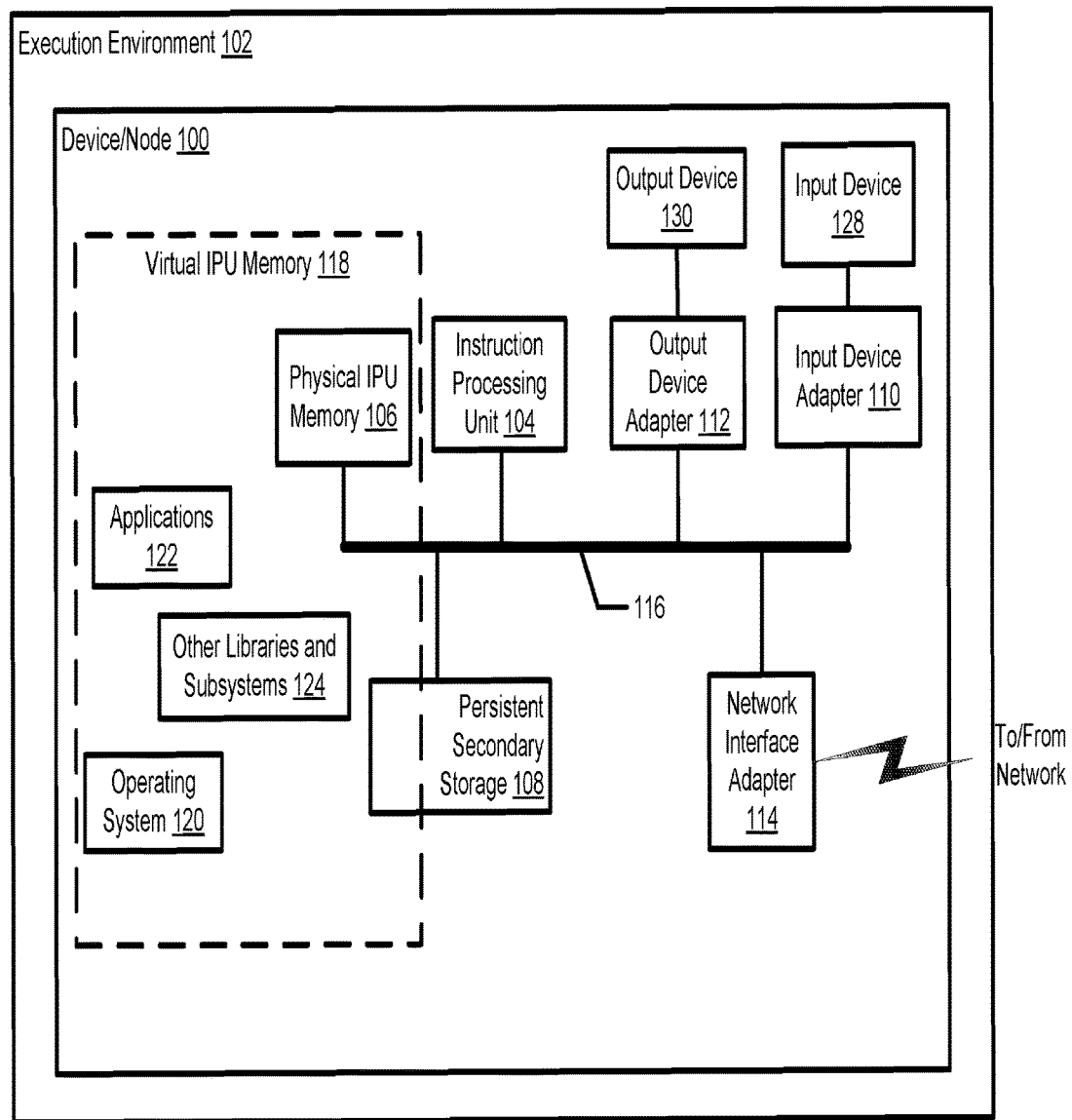
FIG. 1 is a block diagram illustrating an exemplary hardware device included in and/or otherwise providing an execution environment in which the subject matter may be implemented.

An exemplary device included in an execution environment that may be configured according to the subject matter is illustrated in FIG. 1. An execution environment includes an arrangement of hardware and, optionally, software that may be further configured to include an arrangement of components for performing a method of the subject matter described herein.

An execution environment includes and/or is otherwise provided by one or more devices. An execution environment may include a virtual execution environment including software components operating in a host execution environment. Exemplary devices included in or otherwise providing suitable execution environments for configuring according to the subject matter include personal computers, notebook computers, tablet computers, servers, hand-held and other mobile devices, multiprocessor devices, distributed devices, consumer electronic devices, and/or network-enabled devices. Those skilled in the art will understand that the components illustrated in FIG. 1 are exemplary and may vary by particular execution environment.

FIG. 1 illustrates hardware device 100 included in execution environment 102 which includes instruction-processing unit (IPU) 104, such as one or more microprocessors; physical IPU memory 106 including storage locations identified by addresses in a physical memory address space of IPU 104; persistent secondary storage 108, such as one or more hard drives and/or flash storage media; input device adapter 110, such as key or keypad hardware, keyboard adapter, and/or mouse adapter; output device adapter 112, such as a display or audio adapter for presenting information to a user; a network interface, illustrated by network interface adapter 114, for communicating via a network such as a LAN and/or WAN; and a communication mechanism that couples elements 104-114, illustrated as bus 116. Elements 104-114 may be operatively coupled by various means. Bus 116 may comprise any type of bus architecture, including a memory bus, a peripheral bus, a local bus, and/or a switching fabric.

IPU 104 is an instruction execution machine, apparatus, or device. Exemplary IPUs include one or more microprocessors, digital signal processors (DSP), graphics processing units (GPU), application-specific integrated circuits (ASIC), and/or field programmable gate arrays (FPGA).

IPU 104 may access machine code instructions and data via one or more memory address spaces in addition to the physical memory address space. A memory address space includes addresses identifying locations in an IPU memory. IPU 104 may have more than one IPU memory. Thus, IPU 104 may have more than one memory address space. IPU 104 may access a location in an IPU memory by processing an address identifying the location. The processed address may be in an operand of a machine code instruction and/or may be identified in a register or other portion of IPU 104.

FIG. 1 illustrates virtual IPU memory 118 spanning at least part of physical IPU memory 106 and at least part of persistent secondary storage 108. Virtual memory addresses in a memory address space may be mapped to physical memory addresses identifying locations in physical IPU memory 106. An address space for identifying locations in a virtual IPU memory is referred to as a virtual memory address space; its addresses are referred to as virtual memory addresses; and its IPU memory is known as a virtual IPU memory or virtual memory. The term IPU memory may refer to physical IPU memory 106 and/or virtual IPU memory 118 depending on the context in which the term is used.

Various types of memory technologies may be included in physical IPU memory 106. Exemplary memory technologies include static random access memory (SRAM) and/or dynamic RAM (DRAM) including variants such as dual data rate synchronous DRAM (DDR SDRAM), error correcting code synchronous DRAM (ECC SDRAM), and/or RAMBUS DRAM (RDRAM). Physical IPU memory 106 may include volatile memory as illustrated in the previous sentence and/or may include nonvolatile memory such as nonvolatile flash RAM (NVRAM) and/or read-only memory (ROM).

Persistent secondary storage 108 may include one or more flash memory storage devices, one or more hard disk drives, one or more magnetic disk drives, and/or one or more optical disk drives. Persistent secondary storage may include removable media. The drives and their associated computer-readable storage media provide volatile and/or nonvolatile storage for computer readable instructions, data structures, program components, and other data for execution environment 102.

Execution environment 102 may include software components stored in persistent secondary storage 108, in remote storage accessible via a network, and/or in an IPU memory. FIG. 1 illustrates execution environment 102 including operating system 120, one or more applications 122, other program code and/or data components illustrated by other libraries and subsystems 124.

Execution environment 102 may receive user-provided information via one or more input devices illustrated by input device 128. Input device 128 provides input information to other components in execution environment 102 via input device adapter 110. Execution environment 102 may include an input device adapter for a keyboard, a touch screen, a microphone, a joystick, a television receiver, a video camera, a still camera, a document scanner, a fax, a phone, a modem, a network adapter, and/or a pointing device, to name a few exemplary input devices.

Input device 128 included in execution environment 102 may be included in device 100 as FIG. 1 illustrates or may be external (not shown) to device 100. Execution environment 102 may include one or more internal and/or external input devices. External input devices may be connected to device 100 via corresponding communication interfaces such as a serial port, a parallel port, and/or a universal serial bus (USB) port. Input device adapter 110 receives input and provides a representation to bus 116 to be received by IPU 104, physical IPU memory 106, and/or other components included in execution environment 102.

Output device 130 in FIG. 1 exemplifies one or more output devices that may be included in and/or may be external to and operatively coupled to device 100. For example, output device 130 is illustrated connected to bus 116 via output device adapter 112. Output device 130 may be a display device. Exemplary display devices include liquid crystal displays (LCDs), light emitting diode (LED) displays, and projectors. Output device 130 presents output of execution environment 102 to one or more users. In some embodiments, an output device is a device such as a phone, a joystick, and/or a touch screen. In addition to various types of display devices, exemplary output devices include printers, speakers, tactile output devices such as motion producing devices, and other output devices producing sensory information detectable by a user.

A device included in or otherwise providing an execution environment may operate in a networked environment communicating with one or more devices (not shown) via one or more network interfaces. The terms "communication interface" and "network interface" are used interchangeably. FIG. 1 illustrates network interface adapter 114 as a network interface included in execution environment 102 to operatively couple device 100 to a network. The terms "network node" and "node" in this document both refer to a device having a network interface operatively coupled to a network.

Exemplary network interfaces include wireless network adapters and wired network adapters. Exemplary wireless networks include a BLUETOOTH network, a wireless 802.11 network, and/or a wireless telephony network (e.g., a cellular, PCS, CDMA, and/or GSM network). Exemplary wired networks include various types of LANs, wide area networks (WANs), and personal area networks (PANs). Exemplary network adapters for wired networks include Ethernet adapters, Token-ring adapters, FDDI adapters, asynchronous transfer mode (ATM) adapters, and modems of various types. Exemplary networks also include intranets and internets such as the Internet.

Figure 2:
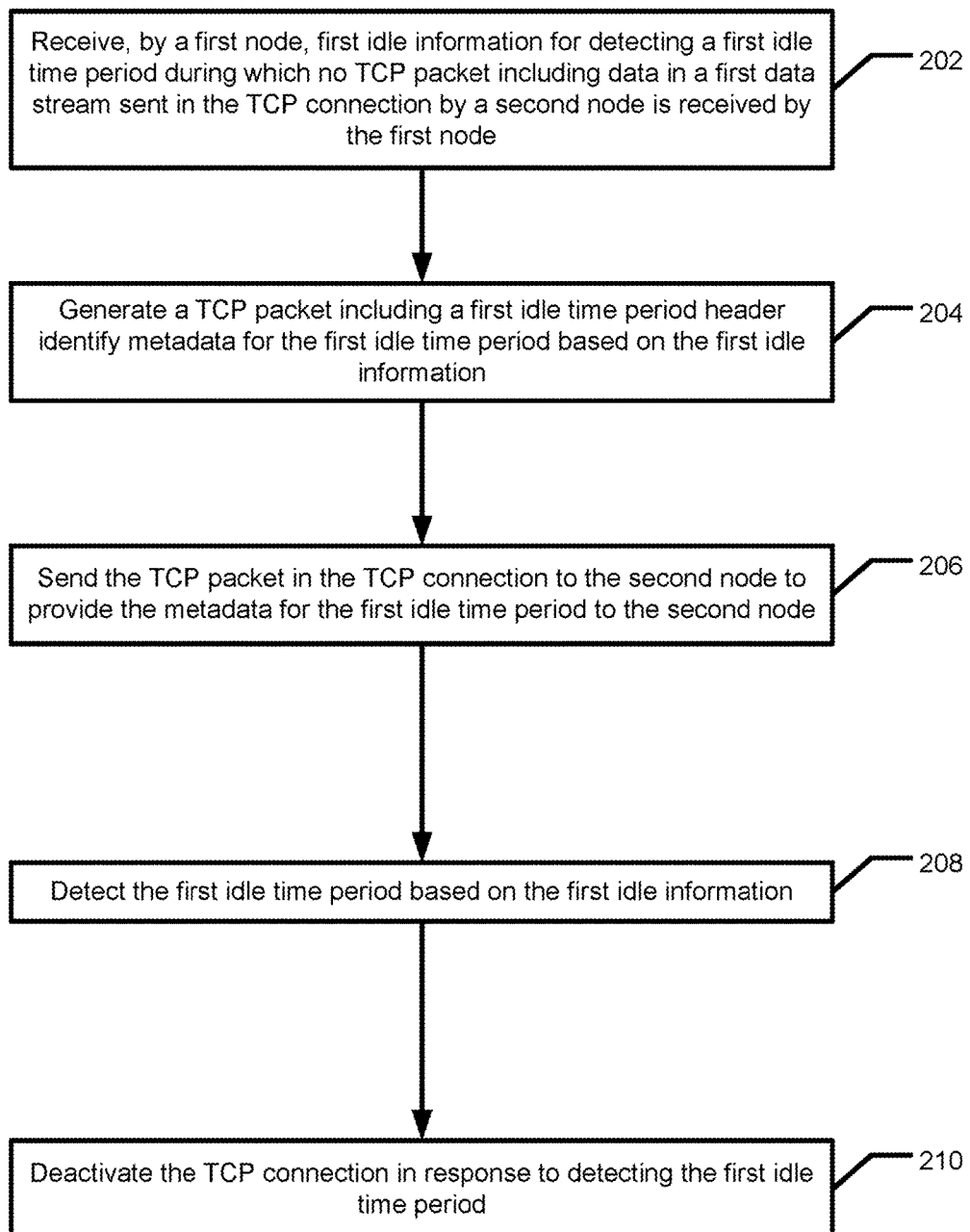
FIG. 2 is a flow diagram illustrating a method for sharing information for detecting an idle TCP connection according to an aspect of the subject matter described herein.
Figure 3:
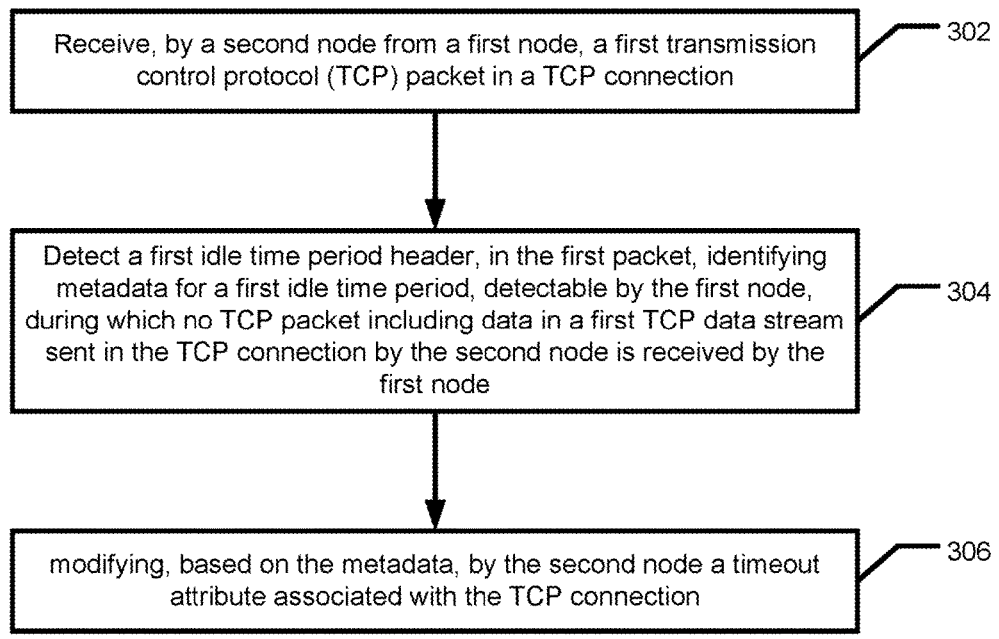
FIG. 3 is a flow diagram illustrating another method for sharing information for detecting an idle TCP connection according to another aspect of the subject matter described herein.

FIG. 2 is a flow diagram illustrating a first method for sharing information for detecting an idle TCP connection according to an exemplary aspect of the subject matter described herein. FIG. 3 is a flow diagram illustrating a second method for sharing information for detecting an idle TCP connection according to an exemplary aspect of the subject matter described herein. FIG. 4*a* is a block diagram illustrating a system for sharing information for detecting an idle TCP connection according to the first method in FIG. 2.

FIG. 4b is a block diagram illustrating a system for sharing information for detecting an idle TCP connection according to the second method in FIG. 3. It is expected that many, if not most, systems configured to perform one of the methods illustrated in FIG. 2 and FIG. 3 will also be configured to perform the other method.

A system for sharing information for detecting an idle TCP connection according to the method illustrated in FIG. 2 includes an execution environment, such as execution environment 102 in FIG. 1, including an instruction processing unit, such as IPU 104, configured to process an instruction included in at least one of an idle time period policy component 450, a packet generator component 452, and a net out-port component 454, a idle time period monitor component 456, and a connection state component 458 illustrated in FIG. 4a.

A system for sharing information for detecting an idle TCP connection performing the method illustrated in FIG. 3 includes an execution environment, such as execution environment 102 in FIG. 1, including an instruction processing unit, such as IPU 104, configured to process an instruction included in at least one of a net in-port component 460, an idle time period option handler component 462, an option attribute handler component 464 illustrated in FIG. 4b.

Components illustrated in FIG. 4a may be adapted for performing the method illustrated in FIG. 2 in a number of execution environments. Components illustrated in FIG. 4b may be adapted for performing the method illustrated in FIG. 3 in a number of execution environments. FIG. 5 is a block diagram illustrating adaptations and/or analogs of the components of FIG. 4a and FIG. 4b in exemplary execution environment 502 including or otherwise provided by one or more nodes. The method depicted in FIG. 2 and the method depicted in FIG. 3 may be carried out by some or all of the exemplary components and/or their analogs.

Figure 4:
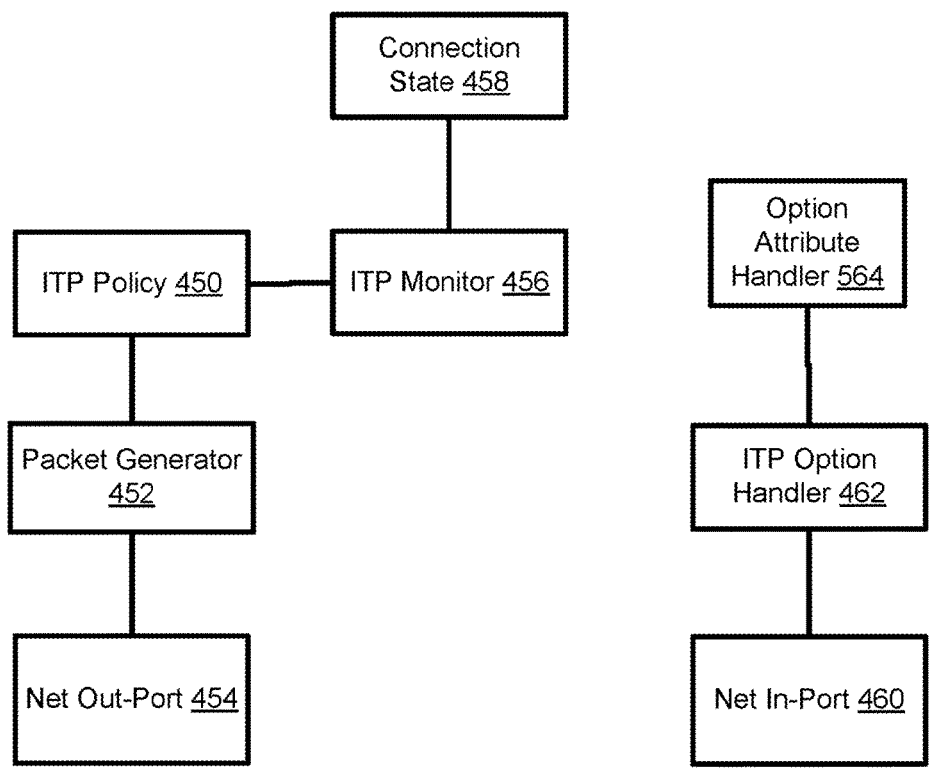
FIG. 4a and FIG. 4b show a block a diagram illustrating an arrangement of components for sharing information for detecting an idle TCP connection according to a further aspect of the subject matter described herein.
Figure 5:
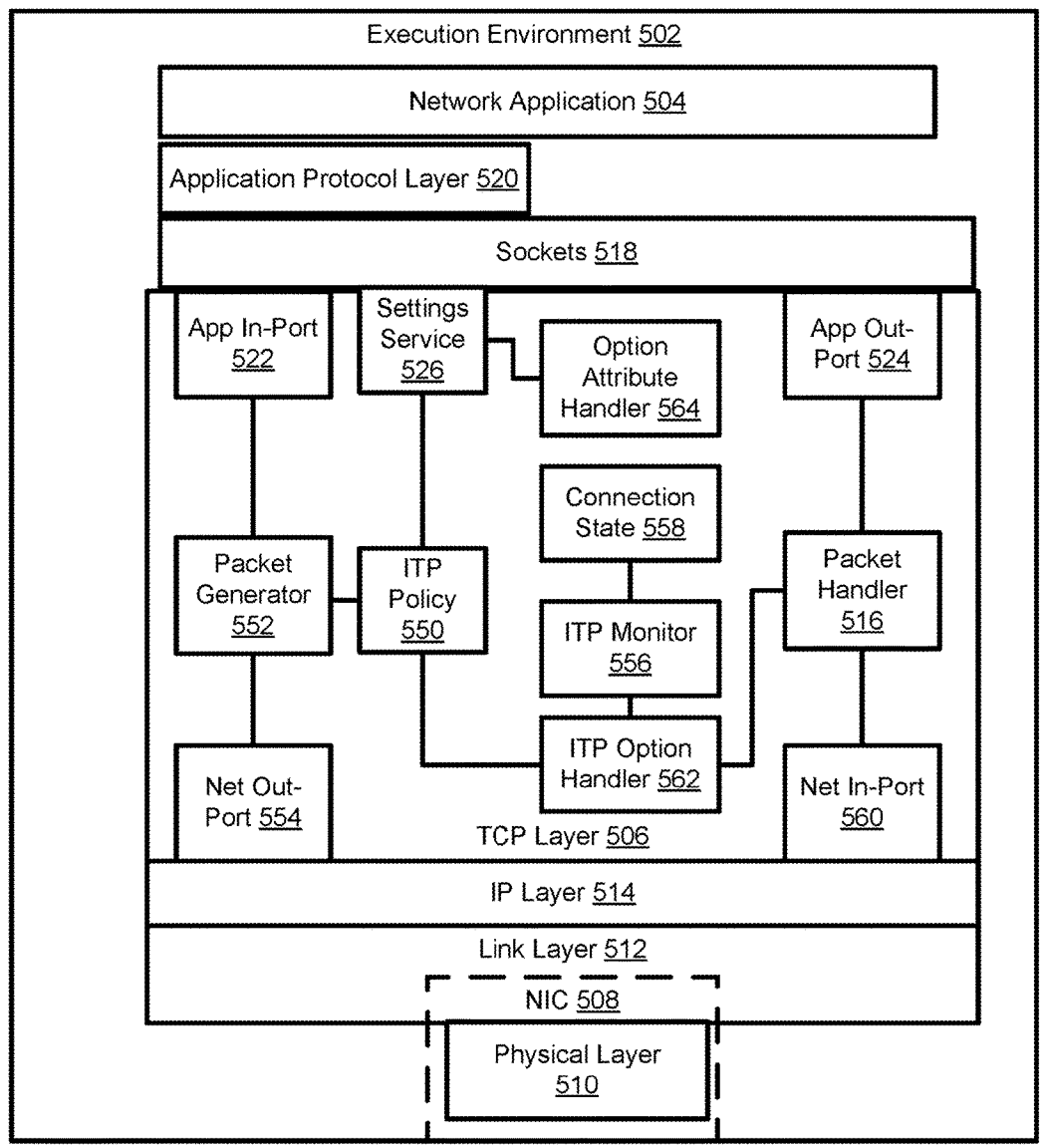
FIG. 5 is a block diagram illustrating an arrangement of components for sharing information for detecting an idle TCP connection according to still another aspect of the subject matter described herein.

The components illustrated in FIG. 4 and FIG. 5 may be included in or otherwise may be combined with some or all of the components of FIG. 1 to create a variety of arrangements of components according to the subject matter described herein.

Figure 6:
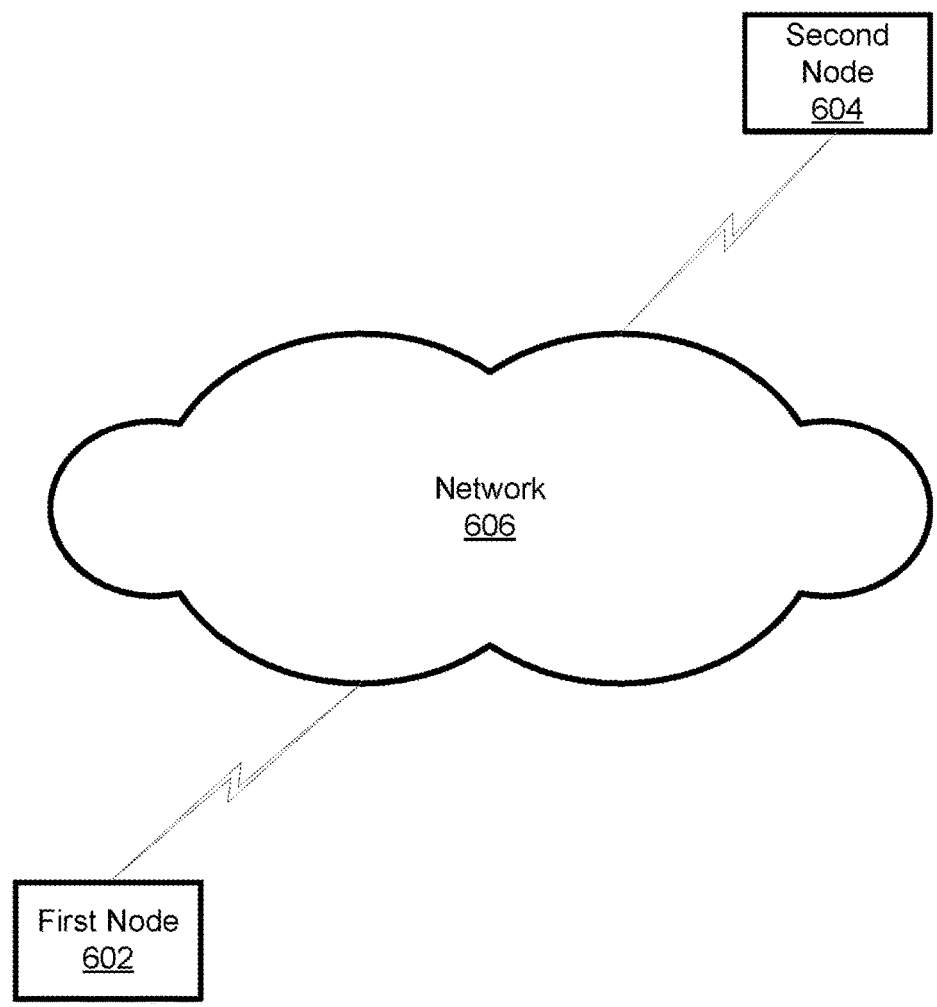
FIG. 6 is a network diagram illustrating an exemplary system for sharing information for detecting an idle TCP connection according to an aspect of the subject matter described herein.
Figure 7:
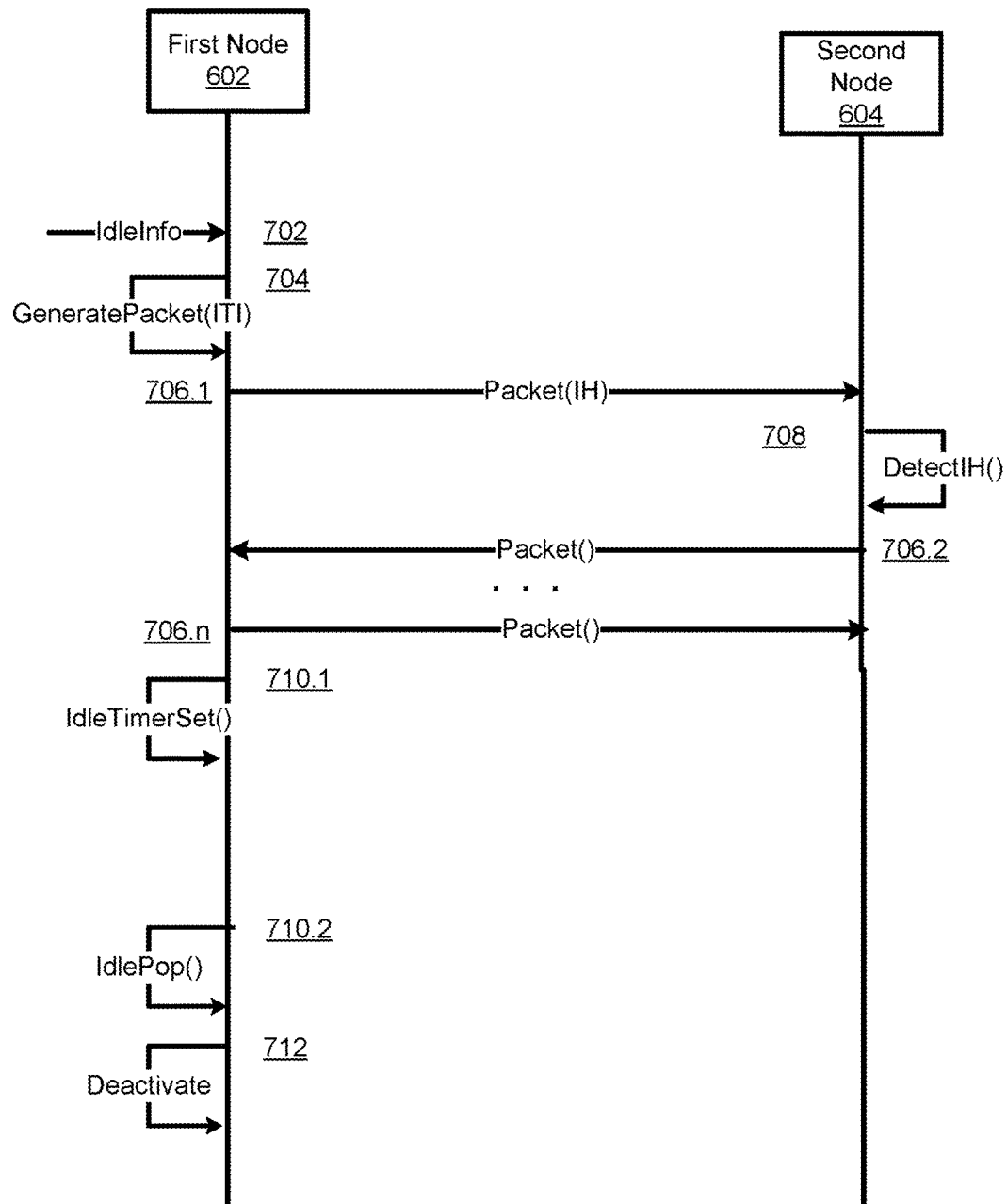
FIG. 7 is a message flow diagram illustrating an exemplary data and execution flow for sharing information for detecting an idle TCP connection according to an aspect of the subject matter described herein.

FIG. 6 illustrates first node 602 and second node 604 as exemplary devices included in and/or otherwise adapted for providing a suitable execution environment, such as execution environment 502 illustrated in FIG. 5, for an adaptation of the arrangement of components in FIG. 4a and an adaptation of the arrangement of components in FIG. 4b. As illustrated in FIG. 6, first node 602 and second node 604 are operatively coupled to network 606 via respective network interfaces enabling first node 602 and second node 604 to communicate. FIG. 7 is a message flow diagram illustrating an exemplary exchange of messages within and between first node 602 and second node 604 according to the subject matter described herein.

As stated, the various adaptations of the arrangements of components in FIG. 4a and in FIG. 4b described herein are not exhaustive.

In FIG. 5, execution environment 502 illustrates a network application 504 operating in a node configured to communicate with one or more other nodes via the TCP supported by TCP layer component 506. For example, first node 602 may be included in and/or provide execution environment 502. Network application 504 may be a first application configured to communicate with an application operating in second node 604 via network 606. Second node 604 may be included in and/or provide another instance of execution environment 502. The operation of both first node 602 and second node 604 are described with respect to execution environment 502. For ease of illustration, both first node 602 and second node 604 are configured with adaptations of the arrangement in FIG. 4a and the arrangement in FIG. 4b. As such, the description of components and corresponding operations with respect to execution environment 502 in FIG. 5 is applicable to both first node 602 and second node 604 in FIG. 6.

In FIG. 5, network interface card (NIC) 508 is an exemplification of a network interface illustrated in FIG. 1 by network interface adapter 114. NIC 508 includes a physical layer component 510 operatively coupling execution environment 502 to one or more physical media for carrying communication signals. The media may be wired, such as an Ethernet LAN operating over CAT 6 cabling, or may be wireless such as an 802.11n LAN. Other exemplary physical layer protocols and corresponding media are identified above.

NIC 508 may also include a portion of link layer component 512. Link layer component 512 may provide for communication between two nodes in a point-to-point communication and/or two nodes in a local area network (LAN). Exemplary link layers and, their protocols have been described above including FDDI, ATM, and Ethernet. A portion of link layer component 512 is external to NIC 508. The external portion may be realized as a device driver for NIC 508.

Link layer component 512 may receive data formatted as one or more internet protocol (IP) packets from internet protocol (IP) layer component 514. Link layer component 512 packages data from IP layer component 514 according to the particular link layer protocol supported. Analogously, link layer component 512 interprets data, received as signals transmitted by the physical media operatively coupled to physical layer component 510, according to a particular link layer protocol supported. Link layer component 512 may strip off link layer specific data and transfer the payload of link layer transmissions to IP layer component 514.

IP layer component 514 illustrated in FIG. 5 is configured to communicate with one or more remote nodes over a LAN and/or a network of networks such as an intranet or the Internet. IP layer component 514 may receive data formatted as TCP packets from TCP layer component 506. IP layer component 514 packages data from TCP layer component 506 into IP packets for transmission across a network. The network may be and/or may include an internet. Analogously, IP layer component 514 interprets data, received from link layer component 512 as IP protocol data and detects IP packets in the received data. IP layer component 514 may strip off IP layer specific data and transfer the payload of one or more IP packets to TCP layer component 506.

In FIG. 5, IP layer component 514 is operatively coupled to TCP layer component 506. TCP layer component 506 is configured to provide a TCP connection over network 606 for sending and/or receiving packets included in the TCP connection between two nodes exemplified by first node 602 and second node 604.

In a TCP connection including first node 602 and second node 604, first node 602 may include a first TCP connection endpoint and second node 604 may include a second TCP connection endpoint. The first and second TCP connection endpoints identify the TCP connection. The TCP connection may have other identifiers, in addition to the included endpoints.

Components of execution environment 502, in an aspect, may interoperate with TCP layer component 506 directly. In another aspect, one or more components, such as network application 504, may interoperate with TCP layer component 506 indirectly. Network application 504 may exchange data with TCP layer component 506 via sockets component 518 and/or an analog of sockets component 518. Alternatively or additionally, network application 504 may communicate with a remote node via an application protocol layer illustrated by application protocol layer component 520. Many application protocols currently exist and new application protocols will be developed. Exemplary application layer protocols include hypertext transfer protocol (HTTP), file transfer protocol (FTP), and extensible messaging and presence protocol (XMPP).

TCP layer component 506 in FIG. 5 may receive data from any of various sources for transmitting in corresponding TCP connections to various corresponding identified TCP connection endpoints in one or more network nodes. FIG. 5 illustrates application in-port (app in-port) component 522 providing an interface component for receiving data to transmit in a TCP connection. FIG. 5 illustrates TCP layer component 506 includes packet generator component 552 configured to package data received by application in-port component 522 for transmitting in one or more TCP packets. The one or more TCP packets are provided to IP layer component 514 via a net out-port component 554 exemplifying an output interface component.

Analogously, TCP layer component 506 interprets data received from IP layer component 514 via net in-port component 560. The data is interpreted as TCP data and TCP packets are detected in the received data by net in-port component 560 and/or packet handler component 516. FIG. 5 illustrates TCP layer component 506 includes packet handler component 516 to strip off and/or otherwise process TCP layer specific data. Packet handler component 516 interoperates with application out-port (app out-port) component 524 to transfer data in the TCP packet included in a TCP data stream to sockets component 518, application protocol layer 520, network application 504, and/or other components associated with the local endpoint of the TCP connection. Detailed information on the operation of TCP is included in RFC 793.

With reference to the method illustrated in FIG. 2, block 202 illustrates the method includes receiving, by a first node, first idle information for detecting a first idle time period during which no TCP packet including data in a first data stream sent in the TCP connection by a second node is received by the first node. Accordingly, a system for sharing information for detecting an idle TCP connection includes means for receiving, by a first node, first idle information for detecting a first idle time period during which no TCP packet including data in a first data stream sent in the TCP connection by a second node is received by the first node. For example, as illustrated in FIG. 4a, idle time period policy component 450 is configured for receiving, by a first node, first idle information for detecting a first idle time period during which no TCP packet including data in a first data stream sent in the TCP connection by a second node is received by the first node.

FIG. 5 illustrates idle time period (ITP) policy component 550 as an adaptation of and/or analog of ITP policy component 450 in FIG. 4a. One or more idle time period policy components 550 operate in execution environment 502.

Message 702 in FIG. 7 illustrates a communication including and/or otherwise identifying idle information received by ITP policy component 550. Message 702 may take various forms in various aspects. Exemplary forms for message 702 include a function/method invocation, a message passed via a message queue, data transmitted via a pipe, a message received via a network, and/or a communication via a shared location in IPU memory and/or secondary storage.

Idle information may be received from a configuration storage location for TCP layer component 506 in an IPU memory and/or in secondary storage 108. The configured idle information may be maintained and/or otherwise managed by settings service component 526 configured to maintain and/or manage various options or settings for TCP layer component 506 and/or one or more TCP connections.

In an aspect, network application 504 provides idle information to ITP policy component 550 via settings service component 526 interoperating with sockets component 518. Sockets component 518 and/or TCP layer component 506 may support TCP options applicable globally for some or all TCP connections and/or may support TCP options on a per connection basis. Per connection TCP options may override global TCP options if global options are also supported. In another aspect, idle information may be received from and/or otherwise received based on information via application protocol layer 520, via sockets component 518, and/or directly from network application 504.

Application protocol layer 520 may provide idle information to ITP policy component 550 via settings service component 526 and, optionally, via sockets component 518. Idle information provided by application protocol layer 520 may be based on data received from network application 504, based on a particular configuration of application protocol layer 520, and/or received from a user and/or administrator of one or both of network application 504 and application protocol layer 520.

In an aspect, the idle information received may be based on a previous ITP header identified in a packet in the TCP connection received by first node 602 from second node 604. The previous packet may be received by net in-port component 560. The previous ITP header may be detected by ITP option handler component 562 interoperating with packet handler component 516. Idle information may be identified and/or otherwise determined by ITP option handler component 562. ITP policy component 550 may interoperate with ITP option handler component 562 to receive the idle information.

Idle information received, determined, and/or otherwise identified may include and/or identify a duration of time for detecting an idle time period. The duration may be specified according to various measures of time including seconds, minutes, hours, and/or days.

Alternatively or additionally, idle information may include and/or identify a generator for determining a duration of time for detecting an idle time period. An exemplary generator may include a formula, an expression, a function, a policy, and/or other mechanism for generating and/or otherwise identifying a duration of time.

In an aspect, one or more algorithms for generating a duration of time for detecting an idle time period may be associated with identifiers. The algorithm identifiers may be standardized within a group of nodes including first node 602 and second node 604. The received idle information may include and/or reference an algorithm identifier. First node 602 and second node 604 may each maintain an association between one or more of the algorithm identifiers and a duration generator such as a function and/or a class configured to perform the identified algorithm.

A duration generator may determine the duration of time for detecting an idle time period based on one or more attributes accessible to one or both of first node 602 and second node 604. Exemplary attributes include a measure of network latency, a measure of network congestion, an indication of the availability of a particular resource, a user specified attribute, a security attribute, an energy usage attribute, a user attribute such as role of the user, and/or a measure of bandwidth supported by NIC 508 and/or a physical network medium operatively coupled to NIC 508.

Alternatively or additionally, idle information may include a parameter such as one or more of the attributes identified in the previous paragraph for use in a duration generator for determining a duration of time for measuring and/or otherwise detecting an idle time period.

A TCP connection may be identified by its endpoints. First node 602 and/or second node 604 may include an endpoint of the TCP connection. Alternatively or additionally, first node 602 and/or second node 604 may include a proxy endpoint representing an endpoint in a TCP connection. Nodes, that provide a network address translation (NAT) service, are exemplary nodes including proxy endpoints.

A node including a TCP connection endpoint is referred to as a host. Hosts are typically user devices and/or servers that typically operate at the edge of a network. While endpoints of most TCP connections are not typically included in network nodes for relaying, routing, and/or otherwise forwarding TCP packet data within a network such as routing nodes and switching nodes. Such network nodes may include one or more connection endpoints for one or more respective TCP connections. It should be understood that the term "host" refers to a role played by a device in a network. First node 602 and/or second node 604 may play the role of a host in a TCP connection and/or may be proxy nodes.

A node is referred to as being in or included in a TCP connection when the node includes an endpoint of the connection and/or includes a proxy for a connection endpoint, referred to as a proxy endpoint. A proxy endpoint and an endpoint in a TCP connection may be in the same node or in different nodes.

In FIG. 5, connection state component 558 may maintain state information for one or more TCP connection endpoints and/or proxy endpoints of corresponding TCP connections included in an instance of an execution environment, such as execution environment 502, included in and/or provided by first node 602 or second node 604.

First node 602 and/or second node 604 may play a role of a proxy node for a node including a TCP connection endpoint. First node 602 and/or second node 604 may include a proxy endpoint representing an endpoint in a TCP connection. A proxy node forwards TCP packet data, sent by a host including a TCP connection endpoint, to another host including a corresponding connection endpoint represented by a proxy endpoint included in the proxy node and vice versa. Exemplary proxy nodes in addition to including routing and/or switching capabilities may include a bridge, a hub, a repeater, a gateway, and a firewall.

In an aspect, a TCP keep-alive option, a TCP user timeout, a retransmission timeout, an acknowledgment timeout, and/or another timeout associated with a TCP connection may be modified based on the first idle information.

For example, in FIG. 5, ITP policy component 550 operating in first node 602 may modify an attribute of a TCP keep-alive option provided by one or more keep-alive components that may include settings service component 526. Modifying a keep-alive attribute may include creating the attribute, deleting the attribute, and/or modifying the attribute. ITP policy component 550 may interoperate with settings service component 526, connection state component 558, and/or a keep-alive option handler component (not shown) to detect the existence and state of one or more keep-alive attributes in determining whether a keep-alive option is active and/or in identifying its current state.

In response to identifying the idle information, ITP policy component 550 may activate, disable, and/or modify the state of the keep-alive option via interoperation with one or more of settings service component 526, connection state component 558, and/or a keep-alive option handler. Thus, in response to identifying the idle information, ITP policy component 550 may prevent and/or alter the time a keep-alive packet is sent to second node 604 from first node 602.

Alternatively or additionally, ITP policy component 550 operating in first node 602 may modify an attribute associated with an acknowledgment timeout configured for TCP layer component 506. Modifying an acknowledgment timeout attribute may include creating the attribute, deleting the attribute, and/or modifying the attribute. ITP policy component 550 may interoperate with settings service component 526, connection state component 558, and/or an acknowledgment option handler component (not shown) to detect the existence and state of one or more packet acknowledgment attributes. In response to identifying the idle information, ITP policy component 550 may modify the state of the packet acknowledgment option. Thus, in response to identifying the idle information, ITP policy component 550 may prevent and/or alter the time an acknowledgment is sent in a packet in a TCP connection.

Returning to FIG. 2, block 204 illustrates the method further includes generating a TCP packet including a first idle time period header identifying metadata for the first idle time period based on the first idle information. Accordingly, a system for sharing information for detecting an idle TCP connection includes means for generating a TCP packet including a first idle time period header identifying metadata for the first idle time period based on the first idle information. For example, as illustrated in FIG. 4*a*, packet generator component 452 is configured for generating a TCP packet including a first idle time period header identifying metadata for the first idle time period based on the first idle information.

FIG. 5 illustrates packet generator component 552 as an adaptation of and/or analog of packet generator component 452 in FIG. 4*a*. One or more packet generator components 552 operate in execution environment 502.

Packet generator component 552 in FIG. 5 may receive idle information and/or information based on the received idle information from ITP policy component 550. Whether and when packet generator component 552 receives information for including an idle time period (ITP) header in a TCP packet may depend on a current state of the associated TCP connection. In FIG. 5, ITP policy component 550 may interoperate with connection state component 558 to determine whether and when to provide information to packet generator component 552 for including an ITP header in a TCP packet.

In an aspect, an ITP header may be included in a packet exchanged during setup of TCP connection. RFC 793 describes a "three-way handshake" for establishing a TCP connection. The synchronization requires each side to send it's own initial sequence number and to receive a confirmation of it in acknowledgment from the other side. Each side must also receive the other side's initial sequence number and send a confirming acknowledgment.

1) A→B SYN my sequence number is X
2) A←B ACK your sequence number is X
3) A←B SYN my sequence number is Y
4) A→B ACK your sequence number is Y Because steps 2 and 3 can be combined in a single message this is called the three way (or three message) handshake.

Other message exchanges may be used in setting up a TCP connection as those skilled in the art will understand. Such other exchanges are not currently supported by the TCP as described in RFC 793. The specified "three-way handshake" and other patterns of message exchange for setting up a TCP connection include packets that are considered to be in the TCP connection for purposes of this disclosure. Including an ITP header may be restricted to packets exchanged in connection setup, excluded from packets exchanged during connection establishment, or allowed in one or more packets exchanged during connection establishments and in packets exchanged after connection setup.

In an aspect, when connection state component 558 and/or ITP policy component 550 determine an ITP header should be included in a TCP packet based on received idle information, packet generator component 552 may include the ITP header in a next TCP packet generated in response to data received via application in-port component 522 for sending to first node 602. In another aspect, packet generator component 552 may send the ITP header in a TCP packet in the TCP connection with no data included in the TCP data stream sent by first node 602 to second node 604. Such a packet is referred to as an empty Packet generator component 554 may send the empty TCP packet when TCP layer component 506 has no for data from an application in second node 604 to send in the TCP data stream to first node 602.

Figure 8:
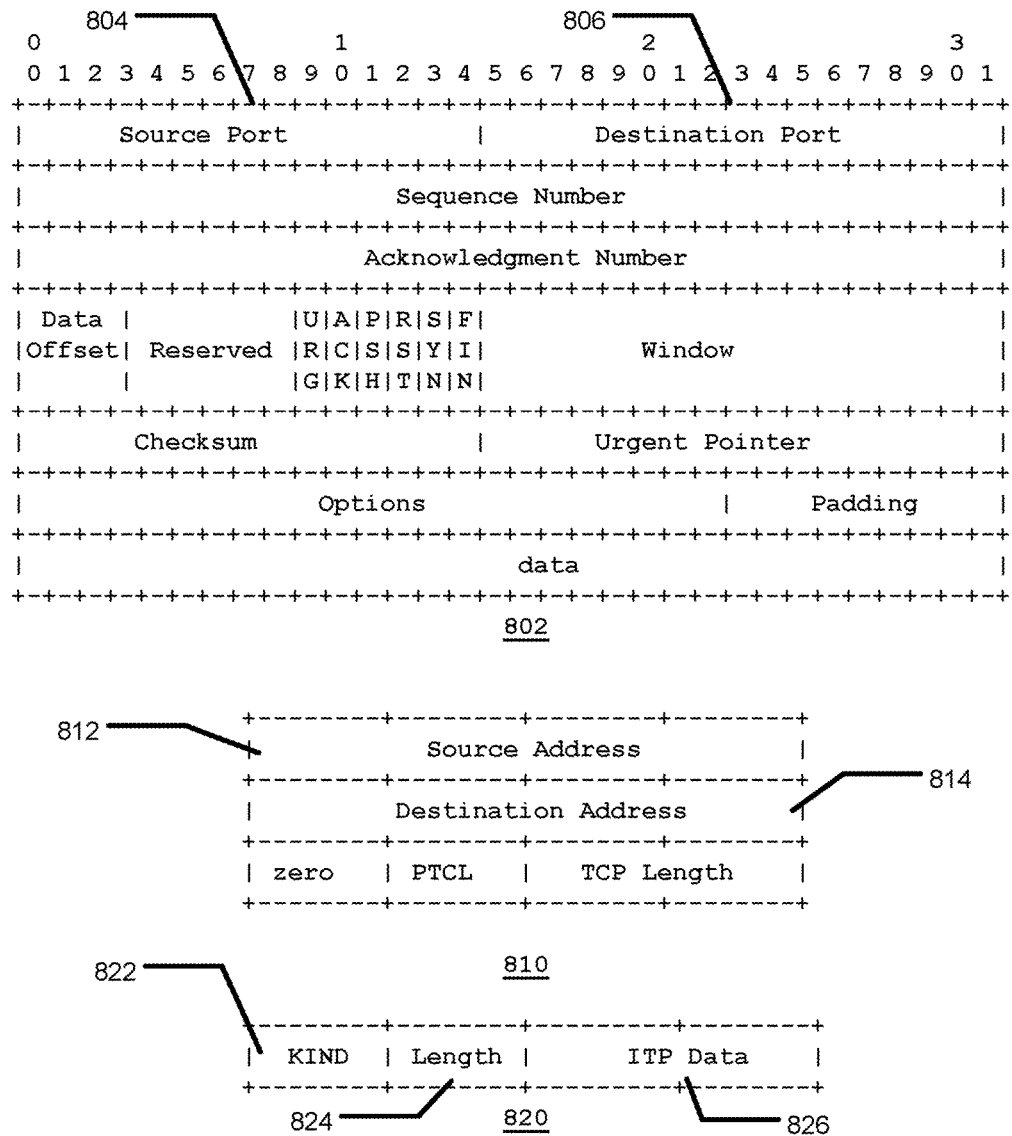
FIG. 8 is a diagram illustrating a structure for a packet transmitted via a network according to an aspect of the subject matter described herein.

Packet generator component 552 may generate a packet according to the TCP specifications and may include a header identified as an ITP header in accordance with specifications for including TCP option headers in a TCP packet. See RFC 793 for more details. FIG. 8 illustrates a format or structure for a TCP packet 802 as described in RFC 793. Each "+" character in FIG. 8, indicates a bit-boundary. TCP packet 802 specifies a location and format for including a source port 804 portion including an identifier for an endpoint of the TCP connection for a sending node and a destination port 806 including an identifier for a corresponding endpoint of the TCP connection in a receiving node. IP packet 810 illustrates a format for an IP packet header for an IP packet including TCP packet data. Source address 812 specifies a location and format in an IP header for including a network address identifying a network interface of the sending node, and destination address 814 identifying a network interface for the receiving node. A network address and a port number identify a connection endpoint in a network. Two endpoints identify a TCP connection.

FIG. 8 also illustrates a format for an exemplary ITP header 820. A KIND location is specified for including an identifier indicating that the option is an idle time period (ITP) option in an ITP header. Identifiers for option headers are currently under the control of the Internet Assigned Numbers Authority (IANA). Length field 824 identifies a length of an ITP header. An ITP data field 826 is specified for including ITP header information for detecting an idle time period as described herein Those skilled in the art will recognize given this disclosure that an ITP header may have other suitable formats and may be included in a TCP packet in structures and locations other than those specified for TCP options in RFC 793. An equivalent or analog of an ITP header may be included in a footer of a protocol packet in an extension and/or variant of the current TCP.

ITP data field 826 in FIG. 8 may include and/or otherwise identify metadata for the first idle time period. For example, an ITP data field in a packet may include and/or otherwise identify one or more of a duration of time for detecting an idle time period, a duration generator for determining a duration of time for detecting an idle time period, and a parameter for use in a duration generator for determining a duration of time for measuring and detecting an idle time period.

Message 704 in FIG. 7 illustrates an invocation and/or other access to packet generator component 552 for generating a TCP packet including an ITP header based on received idle information.

Returning to FIG. 2, block 206 illustrates the method further includes sending the TCP packet in the TCP connection to the second node to provide the metadata for the first idle time period to the second node. Accordingly, a system for sharing information for detecting an idle TCP connection further includes means for sending the TCP packet in the TCP connection to the second node to provide the metadata for the first idle time period to the second node. For example, as illustrated in FIG. 4a, the net out-port component 454 is configured for sending the TCP packet in the TCP connection to the second node to provide the metadata for the first idle time period to the second node.

FIG. 5 illustrates net out-port component 554 as an adaptation of and/or analog of net out-port component 454 in FIG. 4a. One or more net out-port components 554 operate in execution environment 502. Net out-port component 554 is illustrated operatively coupled to packet generator component 552. Net out-port component 554 may receive TCP packet data from packet generator component 552 and interoperate with IP layer component 514 to send the TCP packet in one or more IP packets via network 606 to second node 604. Message 706.1 in FIG. 7 illustrates a TCP packet including an ITP header sent by first node 602 and received by second node 604.

In one aspect, an ITP header may be sent to make sending one or more TCP keep-alive packets by a partner node in the connection unnecessary. A receiver of a packet including an ITP header, such as second node 604, may keep a TCP connection alive based on information in the ITP header.

In another aspect, first node 602 may set a keep-alive timeout attribute based on a duration of the first idle time period identified in the first idle information and/or in the metadata provided to second node 604. For example, first node 602 may monitor a time period during which no non-empty packets are sent or received in the TCP connection. A keep-alive option handler and/or keep-alive component (not shown) operating in first node 602 may set a keep-alive timer according to the timeout attribute, with a duration that will result in the keep-alive timer expiring before an idle time period can occur. In response to detecting a keep-alive timeout, which may be indicated by the expiration of the keep-alive timer, the keep-alive option handler and/or keep-alive policy component may provide information to packet generator component 552 to generate a TCP keep-alive packet. The packet generator component 552 may provide the generated packet to net out-port component 554 for sending the TCP keep-alive packet to second node 604 to determine whether the TCP connection is active and/or to keep the TCP connection active.

In another aspect, ITP policy component 550 operating in first node 602 may set a timer, analogous to the keep-alive timer described in the previous paragraph that expires before an time period can occur. In response the timer expiring, ITP policy component 550 may provide idle information to packet generator component 552 to generate a TCP packet including a second ITP header. Content of the second ITP header may be based on the first idle information received, data received from second node 604, information received from a network application that may be from a user, and/or on any information accessible to TCP layer component 506 in execution environment 502 in first node 602. The TCP packet generated by packet generator component 552 is provided to IP layer component 514 via net out-port component 554 to send to second node 604 in the TCP connection. Along with sending the message, first node 602 may reset and/or otherwise restart detection of the first idle time period. Thus, a second ITP header may be sent in a second TCP packet by first node 602 to second node 602 along with restarting detection of the first idle time period. Alternatively, first node 602 may reset and initiate detection of an idle time period with a different duration than the previous idle time period, based on the idle information for generating the second ITP header.

Returning to FIG. 2, block 208 illustrates the method further includes detecting the first idle time period based on the first idle information. Accordingly, a system for sharing information for detecting an idle TCP connection further includes means for detecting the first idle time period based on the first idle information. For example, as illustrated in FIG. 4a, the idle time period monitor component 456 is configured for idle time period monitor.

FIG. 5 illustrates idle time period monitor component 556 as an adaptation of and/or analog of idle time period monitor component 456 in FIG. 4a. One or more idle time period monitor components 556 operate in execution environment 502.

In an aspect, in response to receiving the first idle information, ITP policy component 550 may store a value representing a duration of time in a configuration storage location. Alternatively, or additionally, ITP policy component 550 may invoke a duration generator to determine a duration of time for detecting the idle time period. The duration generator may be preconfigured for the TCP connection and/or may be identified based on the idle information received. As described, the invoked generator may be invoked with a parameter included in and/or otherwise identified based on the received idle information.

ITP policy component 550 may interoperate with ITP monitor component 556 to identify the duration for detecting the idle time period. ITP monitor component 556, in various aspects, may receive information including and/or otherwise identifying a duration of time, a duration generator, and/or a parameter for a duration generator. ITP monitor component 556 may initiate and/or restart a process for detecting an idle time period. In an aspect, ITP monitor component 556 detects and/or otherwise identifies a beginning of a potential idle time period based on one or more specified events.

In an aspect, detecting the first idle time period by ITP monitor component 556 may include detecting a time period in the idle time period during which first node 602 has received acknowledgment for all data sent via the TCP connection in the TCP data stream by first node 602 to second node 604. Further, the first idle time period may include a time period during which first node 602 has sent one or more TCP packets to second node 604 to acknowledge all data received in a TCP data stream in the TCP connection from second node 604 to first node 602. Detecting the first idle time period by ITP monitor component 556 may include detecting that all received data has been acknowledged and/or that all sent data has been acknowledged.

In an aspect, ITP policy component 550 may include a policy with a rule indicating that an idle time period cannot begin while a TCP packet sent by first node 602 remains unacknowledged by second node 604. ITP policy component 550 may prevent ITP monitor component 556 from initiating detection of an idle time period while unacknowledged data exists. In a further aspect, a time duration may be associated and/or included in the policy identifying a limit to a period of waiting to receive acknowledgment of TCP packet data sent by first node 602. In one aspect, waiting for lack of an acknowledgment for an empty packet does not delay detection of an idle time period, while in another aspect ITP monitor component 556 will not initiate detection while an empty packet remains unacknowledged.

In an aspect, idle information, received by a node may be included in and/or otherwise based on a previous idle time period header identified in a previous TCP packet received in the TCP connection by the node from a remote node prior to sending an ITP header based on the idle information by the node. For example, the first idle information received by ITP policy component 550 in first node 602 may be based on an idle time period header included a TCP packet in the TCP connection sent by second node 604 and received by first node 602 prior to sending the first TCP packet by first node 602. The exchange of ITP headers may include a negotiation between first node 602 and second node 604.

A duration of time may be identified based on the idle information received by ITP policy component in first node 602. A timer may be set according to the identified duration. Detecting the first idle time period may include and/or otherwise may be based on detecting the timer expiration. ITP monitor component 556 may set a timer configured to expire in a time duration identified based on the first idle information received by ITP policy component 550. The identified duration may be longer, shorter, or equal to a duration of the idle time period. ITP monitor component 556 may use multiple timers. ITP monitor component 556 may recalculate and/or otherwise generate a new idle duration based on the idle information at one or more times during detection of the first idle time period. That is, a duration of an idle time period may be static and/or may be dynamic, changing based on attribute information accessible during the detection process and/or based on one or more duration generators.

Message 710.1 illustrates a call and/or other communication between ITP monitor component 556 and a timer component in first node 602 to set a timer included in detecting an idle time period. Prior to the setting the timer, first node 602 and second node 602 may be active in exchanging TCP packets as illustrated by messages including message 706.2 through message 706.n. Those skilled in the art will recognize that detection of an idle time period may not include explicitly and/or directly using a timer. ITP monitor component 556 may monitor other events as a proxy or indirect mechanism for initiating detection and detecting an idle time period.

ITP monitor component 556 may detect one or more events configured to indicate that an idle time period has occurred. For example, expiration of a timer or multiple associated timers may be interpreted by ITP monitor component 556 as marking an occurrence of the first idle time period. Message 710.2 illustrates ITP monitor component 556 receiving information identifying expiration of a timer for detecting the first idle time period.

In a further aspect, in response to detecting the expiration of a timer set as described above, a TCP keep-alive packet may be sent by first node 602 to determine whether the TCP connection is action and/or to keep the TCP connection active. When the keep-alive packet is sent, an acknowledgment timer may be set. If a timeout of the acknowledgment timer is detected indicating no TCP packet has been received acknowledging the keep-alive packet, the first idle time period may be detected in response to and/or otherwise based on the timeout of the acknowledgment timer.

In FIG. 5, ITP policy component 550 in first node 602 may provide a duration identified based on the received idle information to a keep-alive monitor component (not shown). The keep-alive monitor component may configure a keep-alive timer to expire based on the identified duration. In response to detecting expiration of the keep-alive timer, ITP monitor component 556 may invoke packet generator component 552 to generate a TCP keep-alive packet. First node 602 may send the TCP packet to second node 604. The TCP keep-alive packet may be sent to prevent detection of an idle time period by second node 604 and/or may otherwise be sent to detect by first node 602 whether the TCP connection is active.

First node 602 may set an acknowledgment timer associated with sending the packet. If the acknowledgment timer expires before a TCP packet is received from second node 602 acknowledging the packet sent, ITP monitor component 556 may detect the idle time period in response to and/or otherwise based on expiration of the acknowledgment timer.

Receiving a packet from second node 604 included in the TCP connection is an event that, in various aspects, may directly and/or indirectly indicate the beginning of a potential idle time period. A potential idle time period may begin at some specified point during and/or after processing a received TCP packet. In one aspect, an empty TCP packet may be received while a potential idle time period is being monitored. That is, a beginning of the potential idle time period has been detected. In response to receiving the empty TCP packet, monitoring of the current potential time period may be aborted. Further, in response to receiving the empty TCP packet, a beginning of a next potential idle time period may be detected.

In FIG. 5, ITP policy component 550 and ITP monitor component 556 may operate to reset and/or initiate detection of an idle time period in response to receiving an empty TCP packet. First node 602 may receive an empty packet. In response, ITP monitor component 556 may receive an event and/or other indication to reset detection of an idle time period. Resetting the detecting process may be based on whether or not a received empty TCP packet matches a specified condition. ITP option handler component 562 may be configured to determine whether a received empty TCP packet matches the condition. If ITP option handler component 562 determines the empty packet matches the condition, ITP monitor component 556 may be instructed to reset and/or restart detection of the first idle time period including detecting the beginning of a next potential time period.

The condition may match received TCP packets including ITP headers and/or other TCP option headers. A condition may match a port number and/or other field in TCP packet. A condition may further be based on a network address in an IP header including the TCP packet.

In a further aspect, first node 602 may receive via network 606 from second node 604 a TCP packet in the TCP connection including an second ITP header. Message 706.2 in FIG. 7 illustrates the TCP packet sent by second node 604.

ITP option handler component 562 may identify the second ITP header received from second node 604. The identified second ITP header may be for detecting by first node 602 an idle time period, during which no TCP packet in the TCP connection is received, by the first node 602 that includes data in the first TCP data stream from second node 604. The first idle time period may be detected by ITP monitor component 556 in first node 602 based on the second ITP header and based on the received idle information. The second ITP header received in the TCP packet from second node 604 may be based on the first ITP header in the TCP packet sent in the TCP connection by first node 602 to second node 604.

In some aspects, the first node and second node 604 may continue to exchange ITP headers. Information in the exchanged ITP headers may be based on ITP headers received in the TCP connection and/or on data accessible locally to one or both of the nodes. In some aspects, the exchange may be a negotiation while in other the exchange may simply be informational.

Returning to FIG. 2, block 210 illustrates the method further includes deactivating the TCP connection in response to detecting the first idle time period. Accordingly, a system for sharing information for detecting an idle TCP connection further includes means for deactivating the TCP connection in response to detecting the first idle time period. For example, as illustrated in FIG. 4a, the connection state component 458 is configured for deactivating the TCP connection in response to detecting the first idle time period.

FIG. 5 illustrates connection state component 558 as an adaptation of and/or analog of connection state component 458 in FIG. 4a. One or more connection state components 558 operate in execution environment 502.

When ITP monitor component 556 in first node 602 detects an idle time period, ITP monitor component 556 may provide an indication to connection state component 558. The indication may indicate that the idle time period for the TCP connection has been detected and/or otherwise may instruct connection state component 558 and/or other components in TCP layer component 506 to deactivate the TCP connection. Message 712 in FIG. 7 illustrates a communication to deactivate the TCP connection communicated in response to detecting the idle time period.

Deactivating the TCP connection may include closing the TCP connection. A TCP connection may be closed using a three-way handshake packet exchange described in RFC 793. Deactivating the TCP connection may include sending a TCP packet by the detecting node to reset the TCP connection. According to RFC 793, first node 602 may send a TCP packet including a reset (RST) bit set to "1" to indicate a connection reset. Deactivating the TCP connection may include, alternatively or additionally, releasing a resource allocated for maintaining and/or activating the TCP connection.

With respect to the method illustrated in FIG. 3, block 302 illustrates the method includes receiving, by a second node from a first node, a first transmission control protocol (TCP) packet in a TCP connection. Accordingly, a system for sharing information for detecting an idle TCP connection includes means for receiving, by a second node from a first node, a first transmission control protocol (TCP) packet in a TCP connection. For example, as illustrated in FIG. 4b, the net in-port component 460 is configured for receiving, by a second node from a first node, a first transmission control protocol (TCP) packet in a TCP connection.

FIG. 5 illustrates net in-port component 560 as an adaptation of and/or analog of net in-port component 460 in FIG. 4b. One or more net in-port components 560 operate in execution environment 502.

As described above, net in-port component 560 in FIG. 5 may operate in an instance of execution environment 502 and/or an analog included in and/or including second node 604. The TCP packet, illustrated by message 706.1 in FIG. 7 and described above, may be received by net in-port component 560 in second node 604. The TCP packet may include data in a second TCP data stream sent by first node 602 to second node 604 to deliver to a user of TCP layer component 506 in second node 604 such as network application 504. Alternatively, the TCP packet may be an empty TCP packet. The received TCP packet may be a packet included in setting up the TCP connection as described above.

Returning to FIG. 3, block 304 illustrates the method further includes detecting a first idle time period header, in the first packet, identifying metadata for a first idle time period, detectable by the first node, during which no TCP packet including data in a first TCP data stream sent in the TCP connection by the second node is received by the first node. Accordingly, a system for sharing information for detecting an idle TCP connection includes means for detecting a first idle time period header, in the first packet, identifying metadata for a first idle time period, detectable by the first node, during which no TCP packet including data in a first TCP data stream sent in the TCP connection by the second node is received by the first node. For example, as illustrated in FIG. 4b, idle time period option handler component 462 is configured for detecting a first idle time period header, in the first packet, identifying metadata for a first idle time period, detectable by the first node, during which no TCP packet including data in a first TCP data stream sent in the TCP connection by the second node is received by the first node.

FIG. 5 illustrates idle time period option handler component 562 as an adaptation of and/or analog of idle time period option handler component 462 in FIG. 4b. One or more idle time period option handler components 562 operate in execution environment 502.

In FIG. 5, ITP option handler component 562 is operatively coupled to packet handler component 516 The TCP packet, including the ITP header sent by first node 602, may be received, and identified as a TCP packet by net in-port component 560 operating in second node 604. As illustrated in FIG. 5, net in-port component 560 and/or an analog of net in-port component 560 may provide and/or otherwise identify the received packet to packet handler component 516. Packet handler component 516 may detect various portions of the TCP packet according to the TPC packet 802 structure as illustrated in FIG. 8. Alternatively, packet handler component 516 may provide some or all of the packet to various components in TCP layer component 506 to identify portions of the packet according to the TCP specification and/or according to a particular implementation.

The ITP header sent by first node 602 may be received by and/or otherwise identified by ITP option handler component 562. Message 708 in FIG. 7 exemplifies activation of ITP option handler component 562 for detecting the ITP header in the TCP packet received from first node 602 by second node 604.

In various aspects, ITP option handler component 562 operating in second node 604 may detect and/or otherwise determine a duration of time for associated with detection of the idle time period by first node 602, a duration generator, and/or a parameter for a duration generator. The first idle time period header may identify metadata including and/or identifying for detection of the first idle time period by first node 602 a duration of time, a generator for determining a duration of time, and/or an input for determining a duration of time.

Returning to FIG. 3, block 306 illustrates the method yet further includes modifying, based on the metadata, by the second node a timeout attribute associated with the TCP connection. Accordingly, a system for sharing information for detecting an idle TCP connection includes means for modifying, based on the metadata, by the second node a timeout attribute associated with the TCP connection. For example, as illustrated in FIG. 4b, the option attribute handler component 464 is configured for modifying, based on the metadata, by the second node a timeout attribute associated with the TCP connection.

FIG. 5 illustrates option attribute handler component 564 as an adaptation of and/or analog of option attribute handler component 464 in FIG. 4b. One or more option attribute handler components 564 operate in execution environment 502.

In an aspect, ITP option handler component 562 may one or more attribute option handler components 564 to modify one or more corresponding attributes of a keep-alive option, a TCP user timeout, a retransmission timeout, an acknowledgment timeout, and another timeout associated with the TCP connection, in response to identifying the ITP header. The modifying may be based on the content of the ITP header.

For example, ITP option handler component 562 in second node 604 may interoperate with a keep-alive attribute option handler component 564 directly and/or indirectly via settings service component 526, connection state component 558, and/or a keep-alive policy component (not shown) to detect the existence and state of one or more keep-alive attributes in determining whether the keep-alive option is active and/or the state of the keep-alive option.

In response to identifying the idle time period header, ITP option handler component 562 may activate, disable, and/or modify the state of the keep-alive option via interoperation with the keep-alive attribute option handler. Thus, in response to identifying the idle information, attribute option handler component 564 may prevent and/or alter the time a keep-alive packet is sent by second node 604 to first node 602.

Alternatively or additionally, an attribute option handler component 564 may modify an attribute associated with a packet acknowledgment option provided by TCP layer component 506 in first node 602. Modifying a packet acknowledgment attribute may include creating the attribute, deleting the attribute, and/or modifying the attribute. Attribute option handler component 564 may interoperate with settings service component 526, connection state component 558, and/or an acknowledgment policy component (not shown) to detect the existence and state of one or more packet acknowledgment attributes. In response to identifying the idle information, attribute option handler component 564 may modify the state of the packet acknowledgment option. Thus, in response to identifying the idle information, attribute option handler component 564 may prevent and/or alter the time an acknowledgment is sent in a packet data from second node 604 to first node 602 in the TCP connection.

As described herein an ITP header for detecting an idle time period for a TCP connection may serve a number of purposes. A first node in a TCP connection may via an ITP header inform and/or otherwise identify to a second node in the connection one or more durations for detecting an idle time period by one or both nodes. Given multiple purposes, one or more types of ITP headers may be supported and/or an ITP header may be structured to support one or more of the described services. An exchange of ITP headers may be informational and/or may be included in negotiation between two nodes included in a TCP connection. When used in a negotiation, an ITP header may be included in a negotiation protocol that has an identifiable end during a portion of the existence of a TCP connection or may be included in a negotiation that may remain ongoing throughout the existence of a TCP connection. Those skilled in the art will recognize the list of services in this paragraph is not exhaustive.

It should be understood that the various components illustrated in the various block diagrams represent logical components that are configured to perform the functionality described herein and may be implemented in software, hardware, or a combination of the two. Moreover, some or all of these logical components may be combined, some may be omitted altogether, and additional components may be added while still achieving the functionality described herein. Thus, the subject matter described herein may be embodied in many different variations, and all such variations are contemplated to be within the scope of what is claimed.

To facilitate an understanding of the subject matter described above, many aspects are described in terms of sequences of actions that may be performed by elements of a computer system. For example, it will be recognized that the various actions may be performed by specialized circuits or circuitry (e.g., discrete logic gates interconnected to perform a specialized function), by program instructions being executed by one or more instruction processing units, or by a combination of both. The description herein of any sequence of actions is not intended to imply that the specific order described for performing that sequence must be followed.

Moreover, the methods described herein may be embodied in executable instructions stored in a computer readable medium for use by or in connection with an instruction execution machine, system, apparatus, or device, such as a computer-based or processor-containing machine, system, apparatus, or device. As used herein, a "computer readable medium" may include one or more of any suitable media for storing the executable instructions of a computer program in one or more of an electronic, magnetic, optical, electromagnetic, and infrared form, such that the instruction execution machine, system, apparatus, or device may read (or fetch) the instructions from the computer readable medium and execute the instructions for carrying out the described methods. A non-exhaustive list of conventional exemplary computer readable media includes a portable computer diskette; a random access memory (RAM); a read only memory (ROM); an erasable programmable read only memory (EPROM or Flash memory); optical storage devices, including a portable compact disc (CD), a portable digital video disc (DVD), a high definition DVD (HD-DVD™), a Blu-Ray™ disc; and the like.

Thus, the subject matter described herein may be embodied in many different forms, and all such forms are contemplated to be within the scope of what is claimed. It will be understood that various details may be changed without departing from the scope of the claimed subject matter. Furthermore, the foregoing description is for the purpose of illustration only, and not for the purpose of limitation, as the scope of protection sought is defined by the claims as set forth hereinafter together with any equivalents thereof entitled to.

All methods described herein may be performed in any order unless otherwise indicated herein explicitly or by context. The use of the terms "a" and "an" and "the" and similar referents in the context of the foregoing description and in the context of the following claims are to be construed to include the singular and the plural, unless otherwise indicated herein explicitly or clearly contradicted by context. The foregoing description is not to be interpreted as indicating any non-claimed element is essential to the practice of the subject matter as claimed.

I claim:

1. A computer-implemented method, comprising:
    at a server node:
        causing data to be sent to a client node; and
        providing access, to the client node, to code that, in response to being used by the client node, causes the client node to:
            receive, by the client node, a transmission control protocol (TCP)-variant packet,
            detect an idle time period parameter field in the TCP-variant packet,
            identify metadata in the idle time period parameter field for an idle time period, during which, no packet is communicated in a TCP-variant connection to keep the TCP-variant connection active, and
            determine, based on the metadata, a timeout attribute associated with the TCP-variant connection.

2. The method of claim 1 wherein the code, to which the access is provided, is configured such that, in response to being used by the client node, causes the client node to operate such that one or more keep-alive packets are communicated, based on the idle time period.

3. The method of claim 1 wherein the code, to which the access is provided, is configured such that, in response to being used by the client node, causes the client node to operate such that one or more keep-alive packets are communicated, based on a keep-alive period.

4. The method of claim 1 wherein the code, to which the access is provided, is configured such that, in response to being used by the client node, causes the client node to operate such that one or more keep-alive packets are communicated, based on a keep-alive period that is, in turn, based on the idle time period.

5. The method of claim 4 wherein the code, to which the access is provided, is configured such that, in response to being used by the client node, causes the client node to operate such that the keep-alive period is not user-configurable.

6. The method of claim 4 wherein the code, to which the access is provided, is configured such that, in response to being used by the client node, causes the client node to operate such that the keep-alive period is not configurable, while the idle time period is configurable.

7. The method of claim 4 wherein the code, to which the access is provided, is configured such that, in response to being used by the client node, causes the client node to operate such that the one or more keep-alive packets are empty.

8. The method of claim 4 wherein the code, to which the access is provided, is configured such that, in response to being used by the client node, causes the client node to operate such that the keep-alive period is administered using a keep-alive timer.

9. The method of claim 8 wherein the code, to which the access is provided, is configured such that, in response to being used by the client node, causes the client node to operate such that the keep-alive timer is separate from an idle timer that is used to administer the idle time period.

10. The method of claim 4 wherein the code, to which the access is provided, is configured such that, in response to being used by the client node, causes the client node to operate such that the one or more keep-alive packets are conditionally communicated based on at least one keep-alive attribute.

11. The method of claim 10 wherein the code, to which the access is provided, is configured such that, in response to being used by the client node, causes the client node to operate such that the keep-alive attribute is separate from the timeout attribute.

12. The method of claim 1 wherein the code, to which the access is provided, is configured such that, in response to being used by the client node, causes the client node to operate such that a negotiation is performed between another server node and the client node as to the idle time period.

13. The method of claim 1 wherein the code, to which the access is provided, is configured such that, in response to being used by the client node, causes the client node to operate such that the TCP-variant packet is received for the purpose of negotiating a duration of the idle time period.

14. The method of claim 1 wherein the code, to which the access is provided, is configured such that, in response to being used by the client node, causes the client node to operate such that the TCP-variant packet is received for informational purposes and not for negotiating a duration of the idle time period.

15. The method of claim 1 wherein the code, to which the access is provided, is configured such that, in response to being used by the client node, causes the client node to determine, based on the metadata, the timeout attribute associated with the TCP-variant connection, without an ability to negotiate, with another server node, a duration of the idle time period.

16. The method of claim 1 wherein the code, to which the access is provided, is configured such that, in response to being used by the client node, causes the client node to determine, based on the metadata, the timeout attribute associated with the TCP-variant connection, after negotiating, with another server node, a duration of the idle time period.

17. The method of claim 1 wherein the code, to which the access is provided, is configured such that, in response to being used by the client node, causes the client node to determine, based on the metadata, the timeout attribute associated with the TCP-variant connection, after sending, to another server node, a different TCP-variant packet with different metadata in an idle time period parameter field thereof.

18. The method of claim 1 wherein the code, to which the access is provided, is configured such that, in response to being used by the client node, causes the client node to operate such that a duration of the idle time period is configured by an application via an analog of a socket.

19. The method of claim 1 wherein the code, to which the access is provided, is configured such that, in response to being used by the client node, causes the client node to operate such that the metadata is identified by an application via an analog of a socket.

20. A computer-implemented method comprising:
at a server computer including a non-transitory memory storing a network application, and one or more processors in communication with the non-transitory memory for executing the network application to operate in accordance with a first protocol including a transmission control protocol (TCP):
causing a TCP connection to be established with a client computer;
causing first data to be communicated from the server computer to the client computer utilizing the TCP connection in accordance with the TCP protocol and a hypertext transfer protocol (HTTP), for being presented to a user of the client computer;
receiving second data, from the user of the client computer, utilizing the TCP connection in accordance with the TCP protocol and the HTTP protocol; and
permitting access to code that, based on use by the client computer, results in the client computer operating in accordance with a second protocol that is separate from the TCP, in order to establish a second protocol connection with another server computer, by:
identifying idle information for detecting an idle time period, based on which, the second protocol connection is subject to deactivation,
generating a second protocol packet including an idle time period parameter field identifying metadata for the idle time period based on the idle information, and
sending, from the client computer to the another server computer, the second protocol packet to provide the metadata for the idle time period to the another server computer, for use by the another server computer in creating or modifying, based on the metadata, a timeout attribute associated with the second protocol connection.

21. The computer-implemented method of claim 20 wherein:
the use of the code by the client computer results in the client computer utilizing the second protocol instead of the TCP in order to send, from the client computer to the another server computer, the second protocol packet, where the second protocol packet is not sent based on establishing the TCP connection in accordance with the TCP, but is sent based on establishing the second protocol connection so as to permit the second protocol connection to be at least partially closed in response to being inactive based on the timeout attribute;
the access to the code is permitted by permitting the client computer to receive the code from the server computer utilizing the TCP connection and the HTTP protocol;
the timeout attribute is specified in a number of seconds;
the use of the code by the client computer results in the client computer operating such that the timeout attribute is used to keep the second protocol connection open in response to being inactive, and to prevent the another server computer from closing the second protocol connection in response to being inactive; and
the use of the code by the client computer results in the client computer operating such that the identifying the idle information is performed at a non-TCP layer other than a TCP layer, where the non-TCP layer is above an Internet Protocol (IP) layer and below an HTTP application layer.

22. The method of claim 21 wherein the code, to which the access is permitted, is configured to, based on use by the client computer, result in the client computer operating such that one or more keep-alive packets are communicated, based on a keep-alive period that is, in turn, based on the idle time period.

23. The method of claim 22 wherein the code, to which the access is permitted, is configured to, based on use by the client computer, result in the client computer operating such that the keep-alive period is not configurable, while the idle time period is configurable.

24. The method of claim 22 wherein the code, to which the access is permitted, is configured to, based on use by the client computer, result in the client computer operating such that the keep-alive period is administered using a keep-alive timer that is separate from an idle timer that is used to administer the idle time period.

25. The method of claim 22 wherein the code, to which the access is permitted, is configured to, based on use by the client computer, result in the client computer operating such that the one or more keep-alive packets are conditionally communicated based on at least one keep-alive attribute.

26. The method of claim 25 wherein the code, to which the access is permitted, is configured to, based on use by the client computer, result in the client computer operating such that the keep-alive attribute is separate from the timeout attribute.

27. The method of claim 21 wherein the code, to which the access is permitted, is configured to, based on use by the client computer, result in the client computer operating such that the second protocol packet is sent for the purpose of negotiating a duration of the idle time period.

28. The method of claim 21 wherein the code, to which the access is permitted, is configured to, based on use by the client computer, result in the client computer operating such that the second protocol packet is sent for informational purposes and not for negotiating a duration of the idle time period.

29. The method of claim 21 wherein the code, to which the access is permitted, is configured to, based on use by the client computer, result in the client computer operating such that a duration of the idle time period is configured by a particular application via an analog of a socket.

30. The method of claim 29 wherein the code, to which the access is permitted, is configured to, based on use by the client computer, result in the client computer operating such that one or more keep-alive packets are communicated, based on a keep-alive period that is, in turn, based on the idle time period.

31. A computer-implemented method comprising:
at a server computer including a non-transitory memory storing instructions, and one or more processors in communication with the non-transitory memory for executing the instructions such that the server computer operates in accordance with a first protocol including a transmission control protocol (TCP) in order to set up a TCP connection with a client computer:
  causing first data to be communicated from the server computer to the client computer utilizing the TCP connection in accordance with the TCP protocol and a hypertext transfer protocol (HTTP), for being presented to a user of the client computer;
  receiving, at the server computer, second data of the user of the client computer, utilizing the TCP connection in accordance with the TCP protocol and the HTTP protocol; and
  permitting access to code that causes the client computer to operate in accordance with a second protocol that is different from the TCP and that operates above an Internet Protocol (IP) layer and below an HTTP application layer, in order to setup a second protocol connection with another server computer, by:
    receiving, by the client computer from the another server computer, a packet,
    identifying metadata, that specifies a number of seconds or minutes, in an idle time period parameter field in the packet for an idle time period during which, no packet is communicated that meets each of the following criteria: a) communicated via the second protocol connection, and b) causes the second protocol connection to be kept at least partially alive, and
    determining, by the client computer and based on the metadata, a timeout attribute associated with the second protocol connection.

32. The method of claim 31 wherein the code, to which the access is permitted, is configured to cause the client computer to operate such that:
one or more keep-alive packets are communicated, based on a keep-alive period that is, in turn, based on the idle time period;
the keep-alive period is not configurable, while the idle time period is configurable; and
the one or more keep-alive packets are conditionally communicated based on at least one keep-alive attribute.

33. The method of claim 32 wherein the code, to which the access is permitted, is configured to cause the client computer to determine, based on the metadata, the timeout attribute associated with the second protocol connection, without an ability to negotiate, with the another server computer, a duration of the idle time period.

34. The method of claim 32 wherein the code, to which the access is permitted, is configured to cause the client computer to determine, based on the metadata, the timeout attribute associated with the second protocol connection, after negotiating, with the another server computer, a duration of the idle time period.

35. The method of claim 32 wherein the code, to which the access is permitted, is configured to cause the client computer to operate such that a duration of the idle time period is configured by an application via an analog of a socket.

36. The method of claim 31 wherein the code, to which the access is permitted, is configured to cause the client computer to operate such that at least one of:
the access to the code is permitted by sending the code from the server computer to the client computer;
the access to the code is permitted by receiving the code from the another server computer;
the communication includes only receiving;
the communication includes only sending;
the communication includes receiving and sending;
the second protocol includes a variant to the TCP;
the second protocol includes an extension to the TCP;
the second protocol includes a non-TCP protocol;
the second protocol connection includes a first connection that is set up;
the second protocol connection includes an initial connection that is set up;
the metadata specifies a number of seconds;
the metadata specifies a number of minutes;
the packet is informational;
the packet is received directly by the another server computer from the client computer;

the packet is received by the another server computer from the client computer via at least one other intermediate computer;

the timeout attribute is capable being the same as the metadata;

the timeout attribute is capable being different from the metadata;

the timeout attribute specifies a time duration;

the determining the timeout attribute includes at least one of modifying, creating, or deleting the timeout attribute;

the second protocol operates directly above the IP layer;

the second protocol operates directly below a HTTP application layer;

the code includes machine code or program code;

the code includes at least one instruction;

the code is used in connection with a link component;

the code includes a readable instruction;

the code includes a data structure;

the code includes a program component;

the code is a readable instruction;

the code is a data structure;

the code is a program component;

the code is software;

the code includes one or more links;

the code includes at least one of: a readable instruction, a data structure, or a program component;

the code resides at the server computer that is different from the another server computer, and is fetched from the server computer by the client computer; or during the idle time period, a data-equipped second protocol packet is capable of being received by the client computer in another connection separate from the second protocol connection.

37. The method of claim 31 wherein the code, to which the access is permitted, is configured to cause the client computer to operate such that the access to the code is permitted by sending the code from the server computer to the client computer.

38. The method of claim 31 wherein the code, to which the access is permitted, is configured to cause the client computer to operate such that the access to the code is permitted by receiving the code at the client computer from the another server computer.

39. The method of claim 31 wherein the access to the code is permitted by the server computer allowing the code to be communicated to the client computer from the another server computer.

* * * * *

(12) INTER PARTES REVIEW CERTIFICATE (3435th)
United States Patent
Morris

(10) Number: US 10,375,215 K1
(45) Certificate Issued: Feb. 8, 2024

(54) METHODS, SYSTEMS, AND COMPUTER PROGRAM PRODUCTS FOR SHARING INFORMATION FOR DETECTING AN IDLE TCP CONNECTION

(71) Applicant: Robert Paul Morris

(72) Inventor: Robert Paul Morris

(73) Assignee: JENAM TECH, LLC

Trial Number:

IPR2021-00627 filed Mar. 15, 2021

Inter Partes Review Certificate for:

Patent No.: 10,375,215
Issued: Aug. 6, 2019
Appl. No.: 16/040,522
Filed: Jul. 19, 2018

The results of IPR2021-00627 are reflected in this inter partes review certificate under 35 U.S.C. 318(b).

INTER PARTES REVIEW CERTIFICATE
U.S. Patent 10,375,215 K1
Trial No. IPR2021-00627
Certificate Issued Feb. 8, 2024

AS A RESULT OF THE INTER PARTES REVIEW PROCEEDING, IT HAS BEEN DETERMINED THAT:

Claims 1, 4, 8 and 9 are cancelled.

\* \* \* \* \*